US009454065B2

(12) United States Patent
Orton et al.

(10) Patent No.: US 9,454,065 B2
(45) Date of Patent: *Sep. 27, 2016

(54) DEVICE SUPPORT AND TRIGGER APPARATUS

(71) Applicant: KNEKT Industries Ltd., Kailua, HI (US)

(72) Inventors: Benjamin Bodi Orton, Clearlake, WA (US); Harry Reed Antipala, Kailua, HI (US); Kyle Christopher Maligro, Kalaheo, HI (US)

(73) Assignee: KNEKT INDUSTRIES LTD, Kailua, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,654

(22) Filed: Apr. 28, 2015

(65) Prior Publication Data

US 2015/0227030 A1    Aug. 13, 2015

Related U.S. Application Data

(63) Continuation of application No. 14/477,849, filed on Sep. 4, 2014, now Pat. No. 9,022,673.

(60) Provisional application No. 61/874,254, filed on Sep. 5, 2013.

(51) Int. Cl.
*G03B 17/00* (2006.01)
*G03B 17/56* (2006.01)
*F16M 11/00* (2006.01)

(52) U.S. Cl.
CPC ............ *G03B 17/561* (2013.01); *F16M 11/00* (2013.01); *G03B 17/563* (2013.01)

(58) Field of Classification Search
USPC .................................................. 396/420, 425
See application file for complete search history.

(56) References Cited

U.S. PATENT DOCUMENTS

| 2,949,838 | A | * | 8/1960 | Skalabrin | 396/425 |
| 4,221,477 | A | * | 9/1980 | Prochnow et al. | 396/425 |
| 5,081,478 | A | * | 1/1992 | Hayashida et al. | 396/425 |
| 2003/0201371 | A1 | * | 10/2003 | Zadok | 248/276.1 |

* cited by examiner

*Primary Examiner* — W B Perkey
*Assistant Examiner* — Dennis Hancock
(74) *Attorney, Agent, or Firm* — Ash Tankha; Lipton, Weinberger & Husick

(57) ABSTRACT

A device support and trigger apparatus includes a handle, a frame member attached to the handle, a cage member, and a triggering assembly including a trigger section and an actuation section. The cage member rigidly or pivotally connected to the frame member accommodates a device. The cage member can be rigidly positioned in an upright position or can be pivotally rotated to position the device in an upright position or an inverted position. The trigger section is pulled using one hand to allow the actuation section to contact and actuate an activation button of the device positioned in the upright position in front of the handle. A push rod assembly of the device support and trigger apparatus is pushed using one hand to push the trigger section to allow the actuation section to contact and actuate the activation button of the device positioned in the inverted position above the handle.

11 Claims, 22 Drawing Sheets

DEVICE SUPPORT AND TRIGGER APPARATUS

CROSS REFERENCE TO RELATED APPLICATIONS

This application is a continuation of U.S. patent application Ser. No. 14/477,849 titled "Device support and trigger apparatus" filed in the United States Patent and Trademark Office on Sep. 4, 2014, which claims priority to and the benefit of provisional patent application No. 61/874,254 titled "Handle and trigger assembly that enables one handed activation of the shutter button for GoPro Cameras and Housings", filed in the United States Patent and Trademark Office on Sep. 5, 2013. The specification of the above referenced patent application is incorporated herein by reference in its entirety.

BACKGROUND

Modern day cameras, for example, a GoPro® camera of GoPro, Inc., video cameras, etc., are compact and flexible enough to allow the cameras to be mounted on a variety of tripods and camera mounts. These cameras are generally housed in a housing and tightly held to the camera mount using a fastener. When a user uses such a camera in or outside of the housing, the user typically has to depress a shutter release button of the camera with one hand while holding the handle of the camera mount in the other hand. This makes it difficult for the user to control the timing for the activation of the shutter release button of the camera. Moreover, such a configuration makes it difficult for the user to properly frame a shot and to steadily focus the camera to capture photographs or videos. Furthermore, most camera mounts have their mounting sections positioned above a top section of the handle which makes it difficult for the user to balance the weight of the camera while taking a steady shot and to control electronic settings of the camera. The user may also wish to position the camera in an upright position to capture still images and/or moving images or videos of objects in front of them, or in an inverted position to capture self portrait still images and/or moving images or videos.

Hence, there is a long felt but unresolved need for a device support and trigger apparatus that can be held in one hand, that positions a device, for example, a camera in a housing in front of a handle to enable enhanced shot framing, positioning, balance, stability, and control, and that comprises a single pivot hinge trigger assembly for actuating an activation button of the device using the same one hand. Furthermore, there is a need for a device support and trigger apparatus that allows the device to be inverted to capture self portrait still images and/or moving images or videos with one hand.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The apparatus disclosed herein addresses the above stated needs for a device support and trigger apparatus that can be held in one hand, that positions a device, for example, a GoPro® camera of GoPro, Inc., in a housing in front of a handle to enable enhanced shot framing, positioning, balance, stability, and control, and that comprises a single pivot hinge trigger assembly for actuating an activation button of the device using the same one hand. The apparatus disclosed herein also allows the device to be inverted to capture self portrait still images and/or moving images or videos with one hand. The device support and trigger apparatus disclosed herein does not require a user to modify electronic menu settings of the device in order for the device to function in a typical manner in multiple positions. The device support and trigger apparatus that allows the device to be triggered in an upright position and an inverted position is herein referred to as a "flippable device support and trigger apparatus". The flippable device support and trigger apparatus disclosed herein allows a user to capture still images and/or moving images or videos of objects or an environment in front of the user, and also self portrait still images and/or moving images or videos.

The flippable device support and trigger apparatus comprises a handle, a frame member, a cage member, a triggering assembly, and a push rod assembly. The frame member is fixedly attached to an upper end of the handle. The frame member comprises a support section and arms. The arms extend from opposing ends of the support section. The cage member is pivotally connected to the arms of the frame member. The cage member comprises a receptacle configured to accommodate a device, for example, a camera, a smart phone, etc. The cage member is configured to be positioned at a predefined angle with respect to the frame member and pivotally rotated to one of multiple positions, for example, an upright position in front of the handle, an inverted position above the handle, etc., to position the device, for example, in the upright position in front of the handle or in the inverted position above the handle. The triggering assembly is configured to operably communicate with the device accommodated in the receptacle of the cage member. The triggering assembly comprises a trigger section and an actuation section. The trigger section is pivotally connected to the actuation section at a notch positioned on the support section of the frame member. The actuation section extends above the receptacle of the cage member and is configured to contact an activation button of the device. A user pulls the trigger section of the triggering assembly using one hand to bring the actuation section of the triggering assembly in contact with the activation button of the device to actuate the activation button of the device when the cage member with the accommodated device is positioned in the upright position in front of the handle, for example, for capturing still images and/or moving images or videos of one or more objects or an environment in front of the user.

The push rod assembly comprises a rod member and a push button. The rod member is inserted through an opening in the handle to contact the trigger section of the triggering assembly. The push button is operably connected to a distal end of the rod member. The push button pushes the trigger section of the triggering assembly via the rod member when pressed using one hand, to bring the actuation section of the triggering assembly in contact with the activation button of the device to actuate the activation button of the device when the cage member with the accommodated device is positioned in the inverted position above the handle, for example, for capturing self portrait still images and/or moving images or videos. The triggering assembly can therefore actuate the activation button of the device not only in the upright position or down position, but also in the inverted or upward position, for example, for capturing still images and/or moving images or videos of one's self in an environment.

In an embodiment, the device support and trigger apparatus allows the device to be triggered only in an upright position to allow a user to capture still images and/or moving images or videos of objects or an environment in front of the user. This embodiment of the device support and trigger apparatus is herein referred to as a "non-flippable device support and trigger apparatus". The non-flippable device support and trigger apparatus is free of a push rod assembly. In this embodiment, the cage member is rigidly connected to the arms of the frame member in an upright position in front of the handle to accommodate the device in the upright position in front of the handle to allow a user to capture still images and/or moving images or videos of objects or an environment in front of the user using the triggering assembly.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

DETAILED DESCRIPTION OF THE INVENTION

Figure 1A:
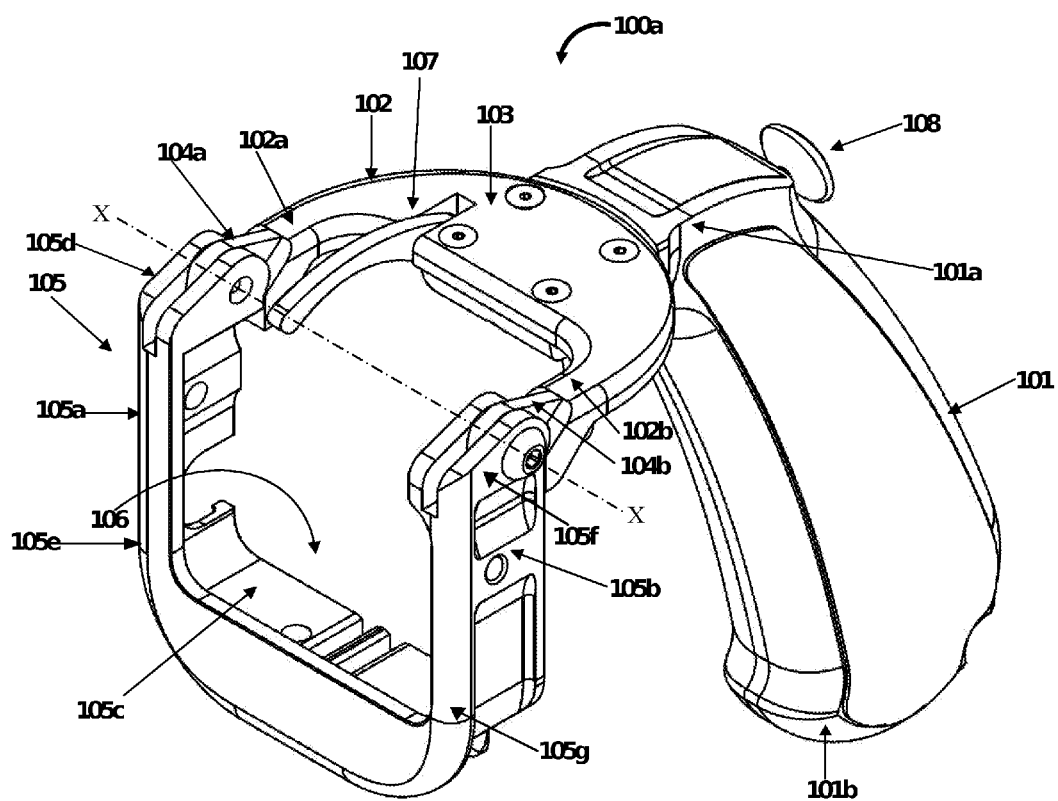
FIG. 1A exemplarily illustrates a right side perspective view of a flippable device support and trigger apparatus.
Figure 1B:
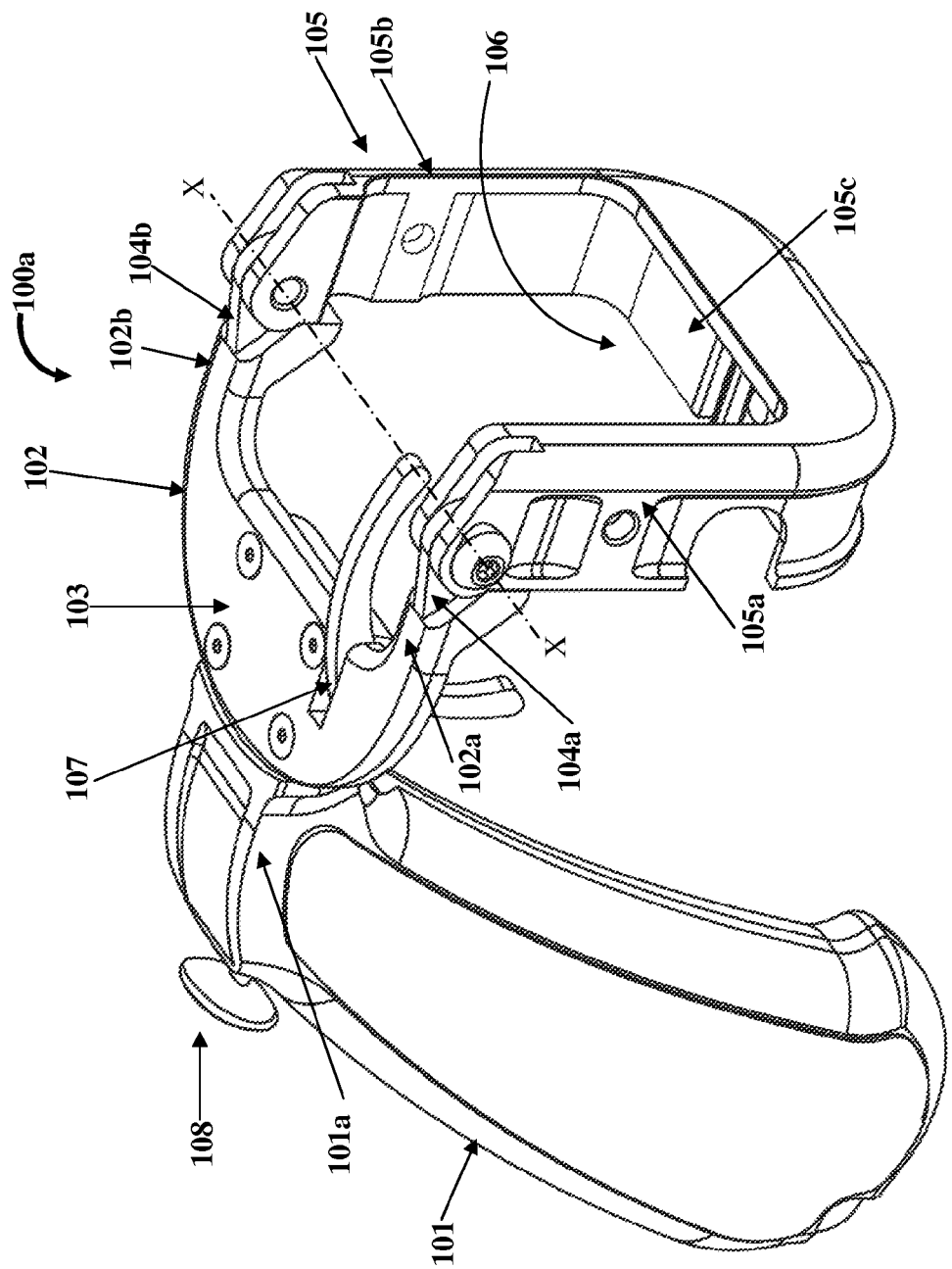
FIG. 1B exemplarily illustrates a left side perspective view of the flippable device support and trigger apparatus.

FIGS. 1A-1B exemplarily illustrate a right side perspective view and a left side perspective view of a flippable device support and trigger apparatus 100a respectively. The flippable device support and trigger apparatus 100a disclosed herein is used to mount and trigger a device 201 exemplarily illustrated in FIGS. 2A-2B. As used herein, the term "device" refers to any electronic device or mechanical device which has an external activation button. The device 201 is, for example, a camera such as a GoPro® camera of GoPro, Inc., a video camera, a mobile phone with an in-built camera, a smart phone, any still image or moving image capture device, etc.

The flippable device support and trigger apparatus 100a disclosed herein comprises a handle 101, a frame member 102, a cage member 105, a triggering assembly 107, and a push rod assembly 108. A user uses the handle 101 to hold the flippable device support and trigger apparatus 100a. The handle 101 is configured to be held by the user in one hand. The frame member 102 is configured, for example, as an asymmetrical upper plate fixedly connected to an upper end 101a of the handle 101. The frame member 102 supports the cage member 105 in front of the handle 101. The frame member 102 is a horizontal fitting element configured to pivotally connect the cage member 105 and the triggering assembly 107. The cage member 105 is configured, for example, as a flip cage and is pivotally connected to the arms 102a and 102b of the frame member 102 via hinge elements 104a and 104b respectively. The arms 102a and 102b of the frame member 102 forwardly extend from a support section 103 of the frame member 102 along a horizontal plane. The cage member 105 pivotally rotates about a pivotal axis X-X. The cage member 105 extends downwardly from the arms 102a and 102b and terminates proximal to a base 101b of the handle 101. The cage member 105 comprises opposing walls 105a and 105b and a base section 105c that define a receptacle 106. Further, the opposing wall 105a comprises an upper end 105d connected to the arm 102a of the frame member 102 and a lower end 105e. The opposing wall 105b comprises an upper end 105f connected to the arm 102b of the frame member 102 and a lower end 105g. The lower end 105e and 105g are connected to the base section 105c as shown in FIG. 1A. The device 201 is mounted in the receptacle 106 of the cage member 105. The opposing walls 105a and 105b and the base section 105c of the cage member 105 surround the perimeter of the device 201 on three sides 201a, 201b, and 201c of the device 201 exemplarily illustrated in FIG. 3. The triggering assembly 107 triggers an external activation button 202 exemplarily illustrated in FIG. 2A, for example, a shutter release button of the device 201. The push rod assembly 108 is inserted through the handle 101 and is in communication with the triggering assembly 107 to actuate the triggering assembly 107 in an opposing direction when compared to a typical triggering action of the triggering assembly 107 as disclosed in the detailed description of FIGS. 2A-2B, FIGS. 5A-5B, and FIGS. 6A-6B.

Figure 2A:
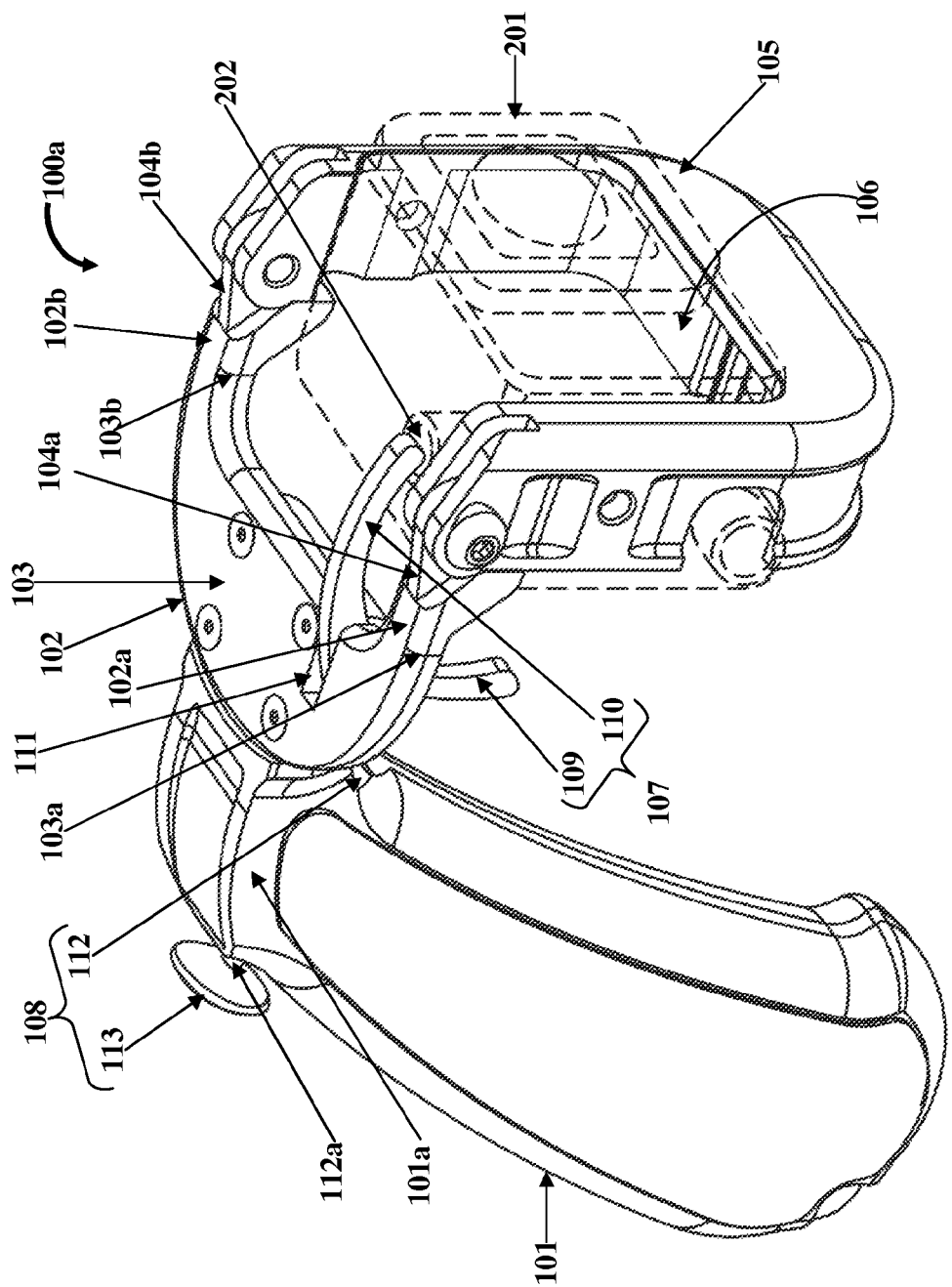
FIG. 2A exemplarily illustrates a left side perspective view of the flippable device support and trigger apparatus, showing a cage member positioned in an upright position in front of a handle of the flippable device support and trigger apparatus and accommodating a device in the upright position in front of the handle.
Figure 2B:
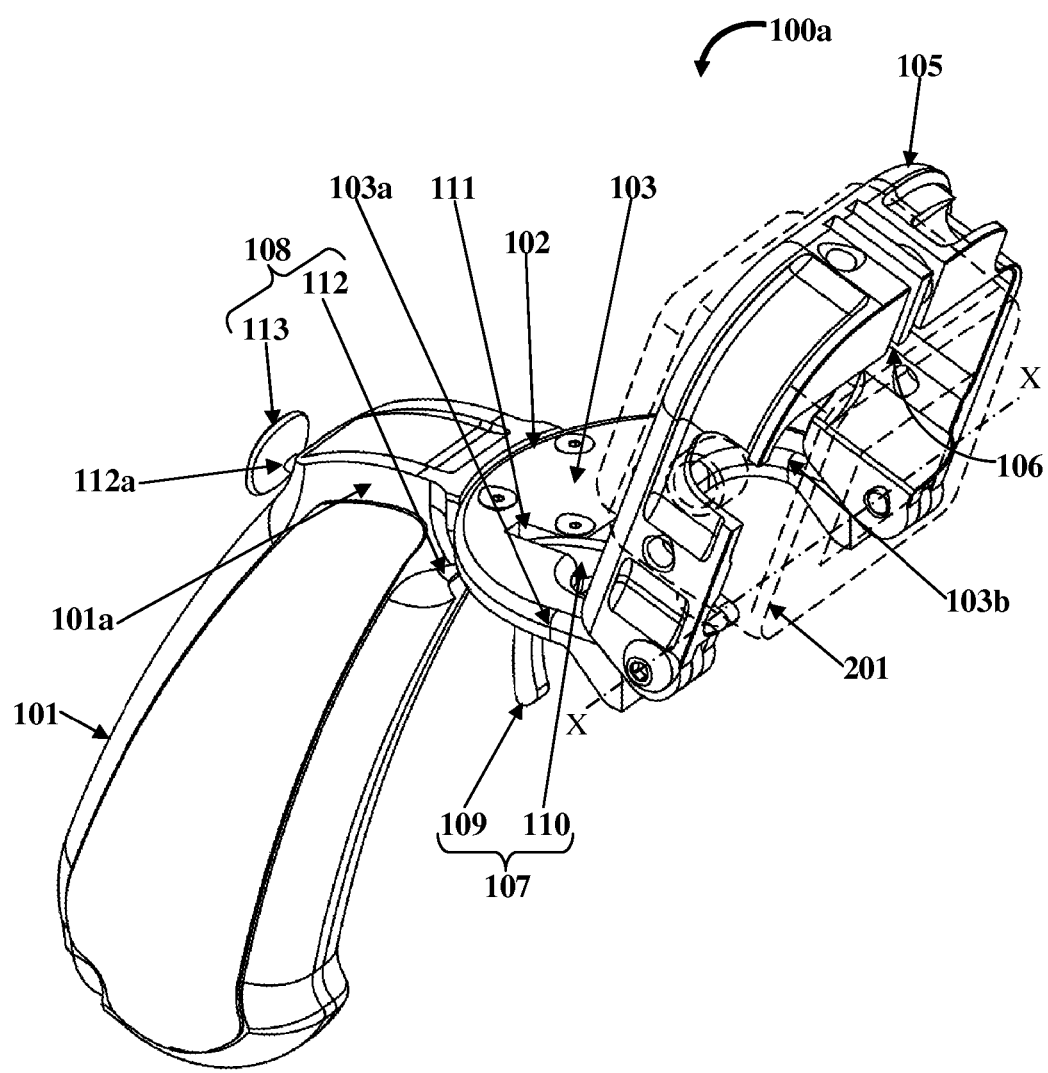
FIG. 2B exemplarily illustrates a left side perspective view of the flippable device support and trigger apparatus, showing the cage member positioned in an inverted position above the handle and accommodating the device in the inverted position above the handle.

FIG. 2A exemplarily illustrates a left side perspective view of the flippable device support and trigger apparatus 100a, showing a cage member 105 positioned in an upright position in front of the handle 101 and accommodating a device 201, for example, a camera in the upright position in front of the handle 101. As used herein, "upright position" refers to a typical vertical position of the cage member 105 or the device 201, for example, a camera with a lens of the camera facing away from the user towards an object in front of the user and the lens. FIG. 2B exemplarily illustrates a left side perspective view of the flippable device support and trigger apparatus 100a, showing the cage member 105 positioned in an inverted position or in a flipped orientation above the handle 101 and accommodating the device 201 in the inverted position above the handle 101. As used herein, "inverted position" refers to an angled or flipped position of the cage member 105 or the device 201, for example, a camera, where the cage member 105 or the device 201 is turned or flipped to an angle in the range of, for example, about 225° to about 270° with respect to the frame member 102, to face a user such that the lens of the camera faces towards the user while the user holds the camera. The frame member 102 is fixedly attached to the upper end 101a of the handle 101. The frame member 102 comprises a support section 103 and arms 102a and 102b as exemplarily illustrated in FIG. 2A. The arms 102a and 102b of the frame member 102 extend from opposing ends 103a and 103b of the support section 103 of the frame member 102 respectively.

The cage member 105 is pivotally connected to the arms 102a and 102b of the frame member 102. The cage member 105 comprises a receptacle 106 configured to accommodate the device 201. The cage member 105 is configured to be positioned at a predefined angle with respect to the frame member 102. For example, in the upright position, the cage member 105 is positioned at 90° with respect to the frame member 102. In another example, in the inverted position, the cage member 105 is positioned in the range of about 225° to about 270° with respect to the frame member 102. The cage member 105 is further configured to be pivotally rotated about the pivotal axis X-X to one of multiple positions, for example, the inverted position above the handle 101, the upright position in front of the handle 101, etc., to position the device 201, for example, in the inverted position above the handle 101 as exemplarily illustrated in FIG. 2B, or in the upright position in front of the handle 101 as exemplarily illustrated in FIG. 2A.

The triggering assembly 107 is configured to operably communicate with the device 201 accommodated in the receptacle 106 of the cage member 105. The triggering assembly 107 comprises a trigger section 109 disposed along a vertical plane and an actuation section 110 disposed along a horizontal plane. The trigger section 109 is pivotally connected to the actuation section 110 at a mid-section 107a of the triggering assembly 107. The mid-section 107a of the triggering assembly 107 is seated on the handle 101 and at a notch 111 positioned on the support section 103 of the frame member 102. The pivotal connection between the trigger section 109 and the actuation section 110 provides a single pivot point activation mechanism for activating the device 201 in two positions, that is, in the upright position and the inverted position. The actuation section 110 of the triggering assembly 107 extends above the receptacle 106 of the cage member 105 and protrudes forwardly from the support section 103 in the horizontal plane in front of the handle 101. Further, the actuation section 110 is configured to pivot and contact an activation button 202 of the device 201 that is located below the activation section 110. The trigger section 109 of the triggering assembly 107 is configured to be pulled using one hand to bring the actuation section 110 of the triggering assembly 107 in contact with the activation button 202 of the device 201 to actuate the activation button 202 of the device 201 when the cage member 105 with the accommodated device 201 is positioned in the upright position in front of the handle 101 as exemplarily illustrated in FIG. 2A.

The push rod assembly 108 comprises a rod member 112 and a push button 113. The rod member 112 is inserted through an opening 126 in the handle 101 exemplarily illustrated in FIG. 3, to contact the trigger section 109 of the triggering assembly 107. The push button 113 is operably connected to one end 112a of the rod member 112. The push button 113 is configured to push the trigger section 109 of the triggering assembly 107 via the rod member 112 when pressed using one hand to bring the actuation section 110 of the triggering assembly 107 in contact with the activation button 202 of the device 201 to actuate the activation button 202 of the device 201 when the cage member 105 with the accommodated device 201 is positioned in the inverted position above the handle 101.

The flippable device support and trigger apparatus 100a disclosed herein therefore allows the device 201 to be triggered in two positions, for example, by pulling of the trigger section 109 of the triggering assembly 107 using an index finger of one hand when the cage member 105 with the accommodated device 201 is in the upright position, and by the pushing of the push rod assembly 108 using the thumb of the same one hand when the cage member 105 with the accommodated device 201 is in the inverted position. In an embodiment, the device 201 can be triggered in one or both positions, for example, for capturing still images and/or moving images or videos in one or both positions.

Figure 3:
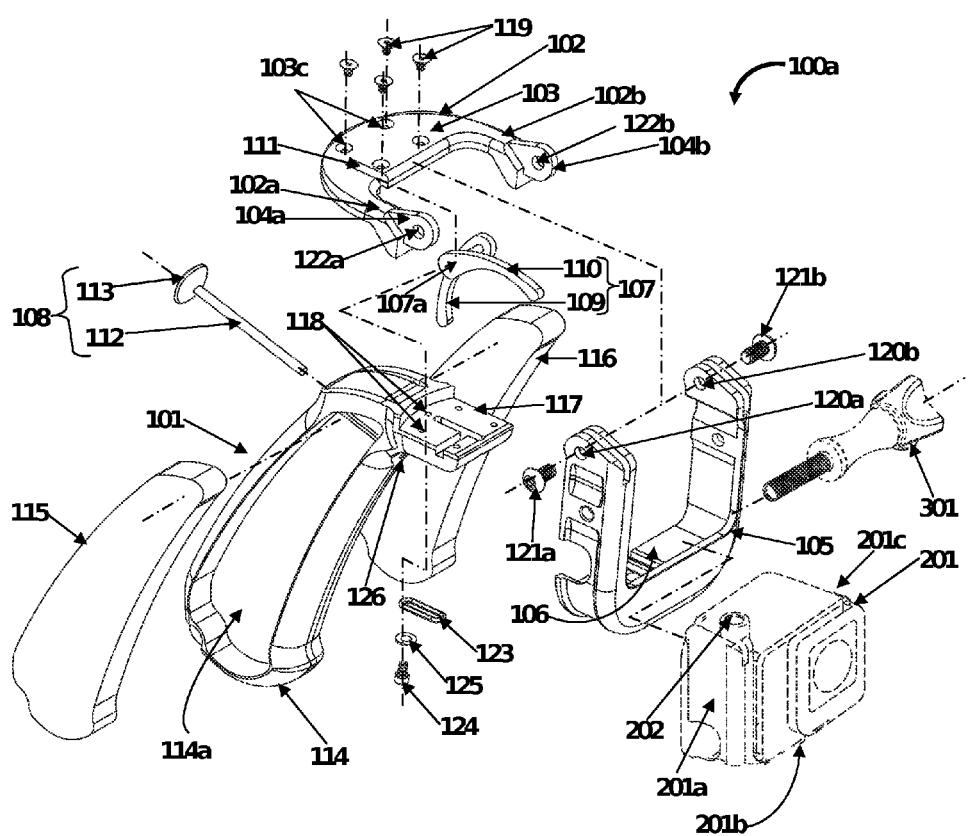
FIG. 3 exemplarily illustrates an exploded view of the flippable device support and trigger apparatus.

FIG. 3 exemplarily illustrates an exploded view of the flippable device support and trigger apparatus 100a. In an embodiment, the handle 101 of the flippable device support and trigger apparatus 100a comprises a handle frame 114, a first segment 115, and a second segment 116. The first segment 115 is, for example, a left handle insert, and the second segment 116 is, for example, a right handle insert. The first segment 115 and the second segment 116 are adjoined to each other within a space 114a defined in the handle frame 114. The handle 101 is, for example, of a generally oblong shape. In an embodiment, the flippable device support and trigger apparatus 100a disclosed herein further comprises an intermediate member 117 fixedly attached to and extending from the handle 101. The intermediate member 117 comprises one or more through holes 118 to fixedly attach to the frame member 102 using one or more fastening members 119, for example, #4-40×7/16" inch stainless steel flat head cap screws. The frame member 102 is positioned on the intermediate member 117, and the fastening members 119 are first inserted into the through holes 103c of the frame member 102 and then through the through holes 118 of the intermediate member 117 to connect the frame member 102 to the intermediate member 117. In an embodiment, the frame member 102 comprising the support section 103 and the arms 102a and 102b is of a generally U shape or a flat asymmetrical horseshoe shape.

In an embodiment, the cage member 105 is generally U shaped as exemplarily illustrated in FIG. 3. The cage member 105 comprises a receptacle 106 of, for example, a generally U shape for accommodating the device 201. In an embodiment, the cage member 105 comprises at least two openings 120a and 120b configured to be pivotally connected to the arms 102a and 102b of the frame member 102 via the hinge elements 104a and 104b respectively, using at least two tension fasteners 121a and 121b, for example, M5×10 stainless steel button head cap screws or a quick release fastener fastened into the openings 120a and 120b. The tension fasteners 121a and 121b are inserted through the openings 120a and 120b of the cage member 105 and through the openings 122a and 122b of the hinge elements 104a and 104b respectively, to pivotally connect the cage member 105 to the frame member 102. The cage member 105 pivotally rotates about the pivotal axis X-X exemplarily illustrated in FIGS. 1A-1B. The pivotal axis X-X passes through the openings 120a and 120b of the cage member 105.

The two tension fasteners 121a and 121b are tightened to hold the cage member 105 in one of the positions, for example, the upright position or the inverted position under a tension at the arms 102a and 102b of the frame member 102. The two tension fasteners 121a and 121b are loosened to release the tension from the cage member 105 and allow the pivotal rotation of the cage member 105 about the pivotal axis X-X and repositioning of the cage member 105 with respect to the frame member 102, and then are re-tightened to hold the cage member 105 in the new position. Consider an example where the cage member 105 and the frame member 102 are held together by two tension fasteners 121a and 121b, for example, button head cap screws. These button head cap screws create the tension that holds the cage member 105 in the upright position and the inverted position. In order to rotate the cage member 105, the button head cap screws are loosened, the cage member 105 is rotated, and then the button head cap screws are re-tightened. In an embodiment, a single tension fastener, tensioner or detent, for example, 121a or 121b, is used to secure the cage member 105 to the frame member 102 in position. In another embodiment, a double tension fastener, tensioner or detent (not shown) is used to secure the cage member 105 to the frame member 102 in position. For purposes of illustration, the detailed description refers to tension fasteners being button head cap screws, for example, 121a and 121b, and single or double tension fasteners used to create the tension to lock the cage member 105 in the upright position and the inverted position; however the scope of the flippable device support and trigger apparatus 100a disclosed herein is not limited to the tension fasteners being button head cap screws, for example, 121a and 121b, and single or double tension fasteners, but may be extended to include other types of fasteners, quick release mechanisms, and functionally equivalent structures that can be used for creating the tension to lock the cage member 105 in the upright position and the inverted position.

In an embodiment, the receptacle 106 of the cage member 105 is configured in one of multiple shapes and sizes to accommodate any device 201 of any shape and size. The cage member 105 can be configured or shaped to mount other devices of multiple shapes and sizes, for example, other brands of still image cameras, video cameras, mobile phones with in-built cameras, smart phones, music players, etc. The device 201, for example, a GoPro® camera is fastened to the receptacle 106 of the cage member 105 using a device fastener 301, for example, a screw fastener commercially supplied along with a GoPro® camera. The triggering assembly 107 comprises the trigger section 109 and the actuation section 110. The trigger section 109 is pivotally connected to the actuation section 110. An O-ring member 123, for example, a spring return element, is coupled with a fastener screw 124 and a washer 125 to pivotally connect the trigger section 109 and the actuation section 110 at the notch 111 positioned on the support section 103 of the frame member 102. The fastener screw 124 is, for example, a #4-40×½" inch stainless steel button head cap screw. The washer 125 is, for example, a #4 stainless steel washer.

As exemplarily illustrated in FIG. 3, the push rod assembly 108 comprises a rod member 112 and a push button 113. The rod member 112 is, for example, an elongate rod. The push button 113 is, for example, a thumb button configured to be pushed by a thumb of a user. The rod member 112 is inserted through an opening 126 in the handle 101 to operably communicate with the trigger section 109 of the triggering assembly 107 as disclosed in the detailed description of FIG. 2A-2B.

Figure 4A:
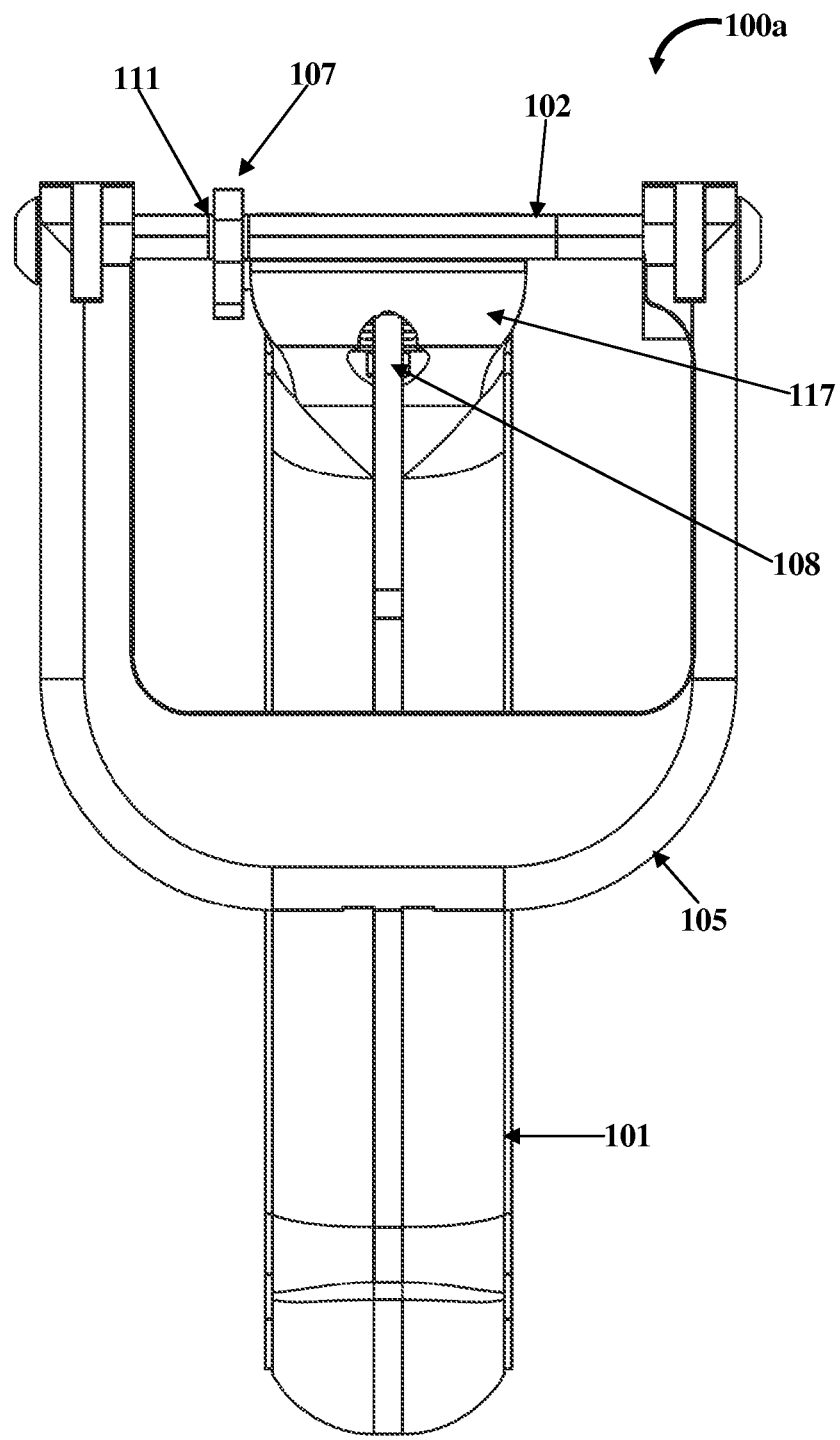
FIG. 4A exemplarily illustrates a front elevation view of the flippable device support and trigger apparatus, showing the cage member positioned in an upright position in front of the handle.
Figure 4B:
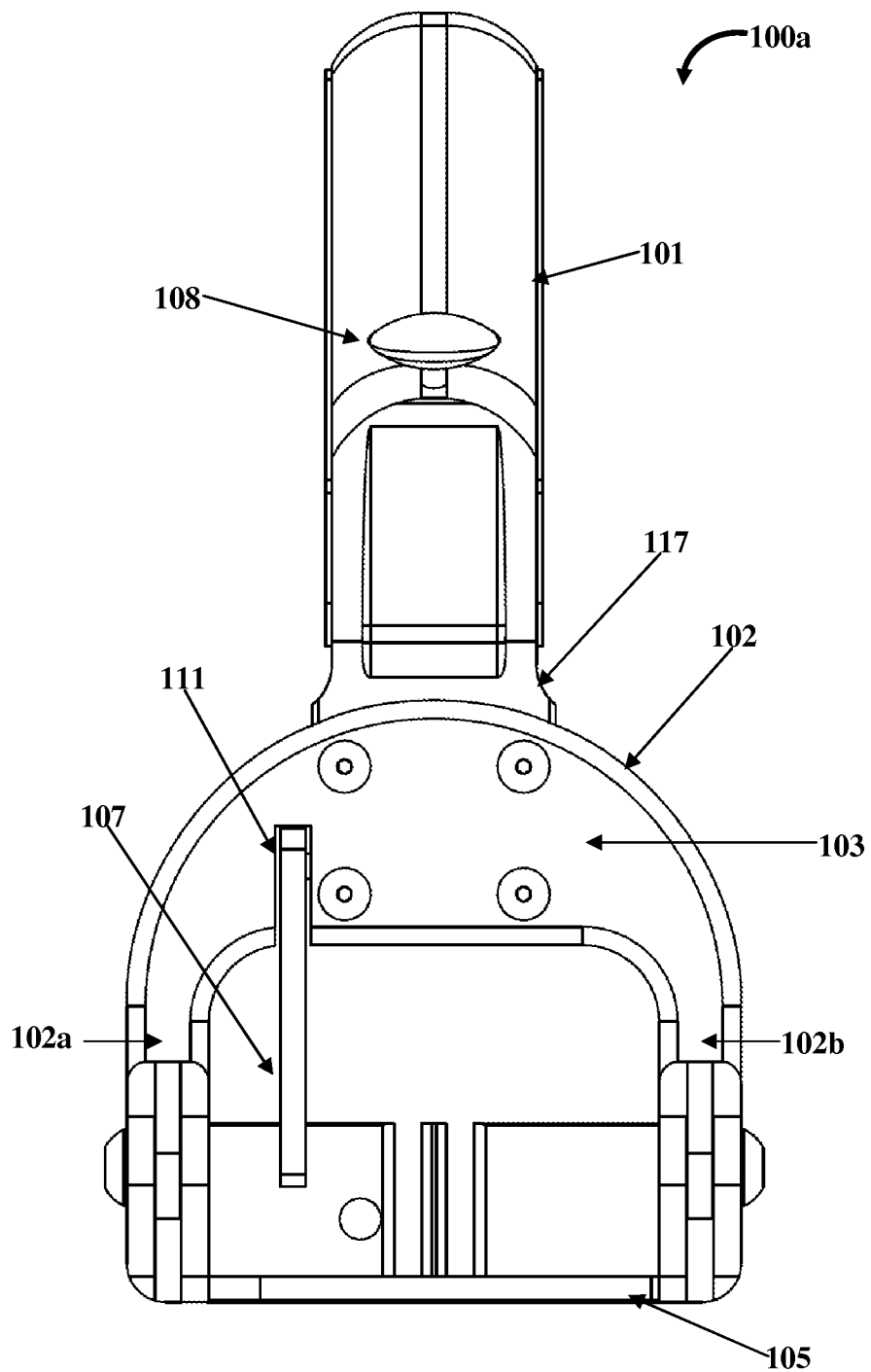
FIG. 4B exemplarily illustrates a top plan view of the flippable device support and trigger apparatus when the cage member is positioned in an upright position.
Figure 4C:
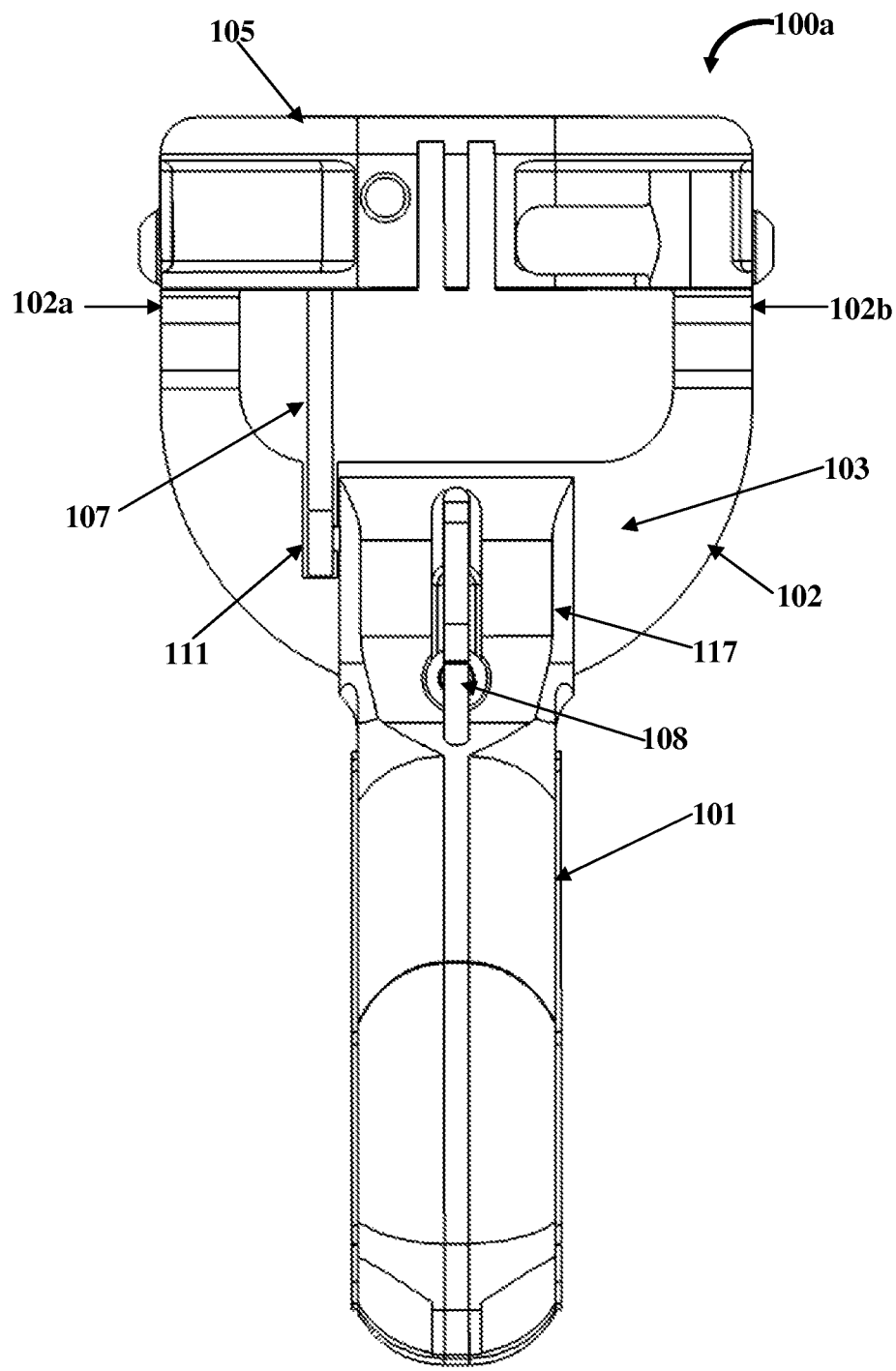
FIG. 4C exemplarily illustrates a bottom view of the flippable device support and trigger apparatus when the cage member is positioned in an upright position.
Figure 4D:
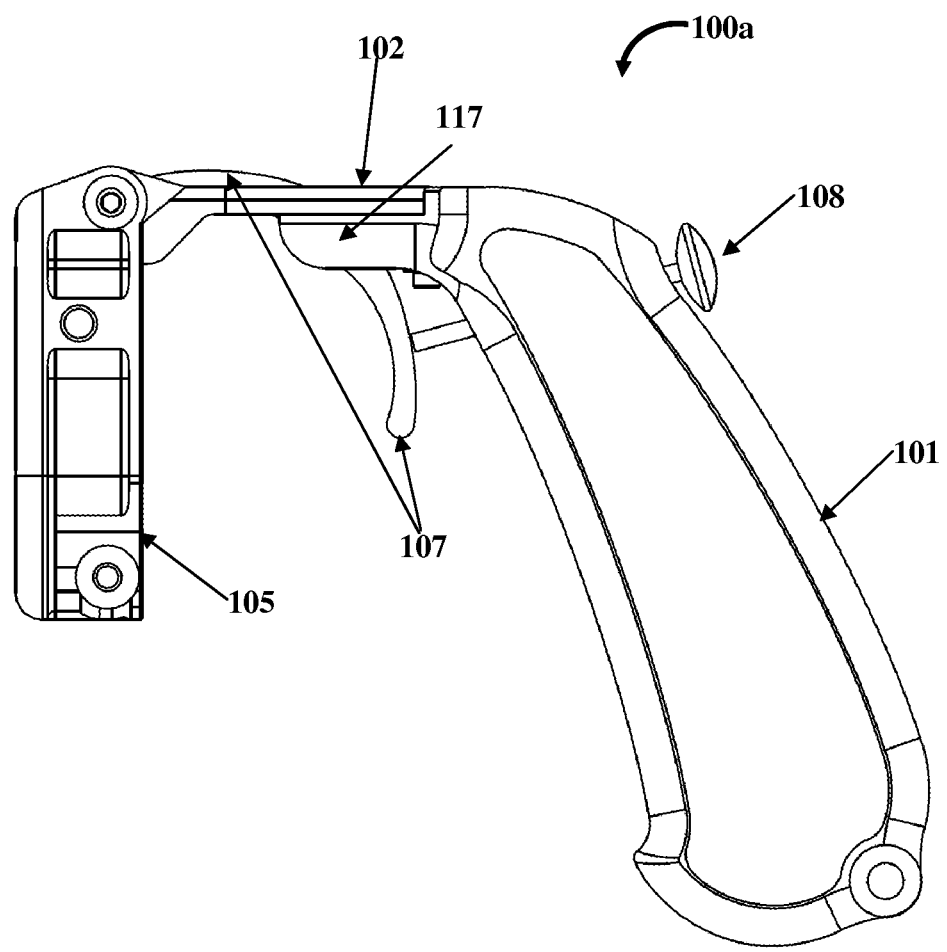
FIG. 4D exemplarily illustrates a right side elevation view of the flippable device support and trigger apparatus, showing the cage member positioned in an upright position in front of the handle.
Figure 4E:
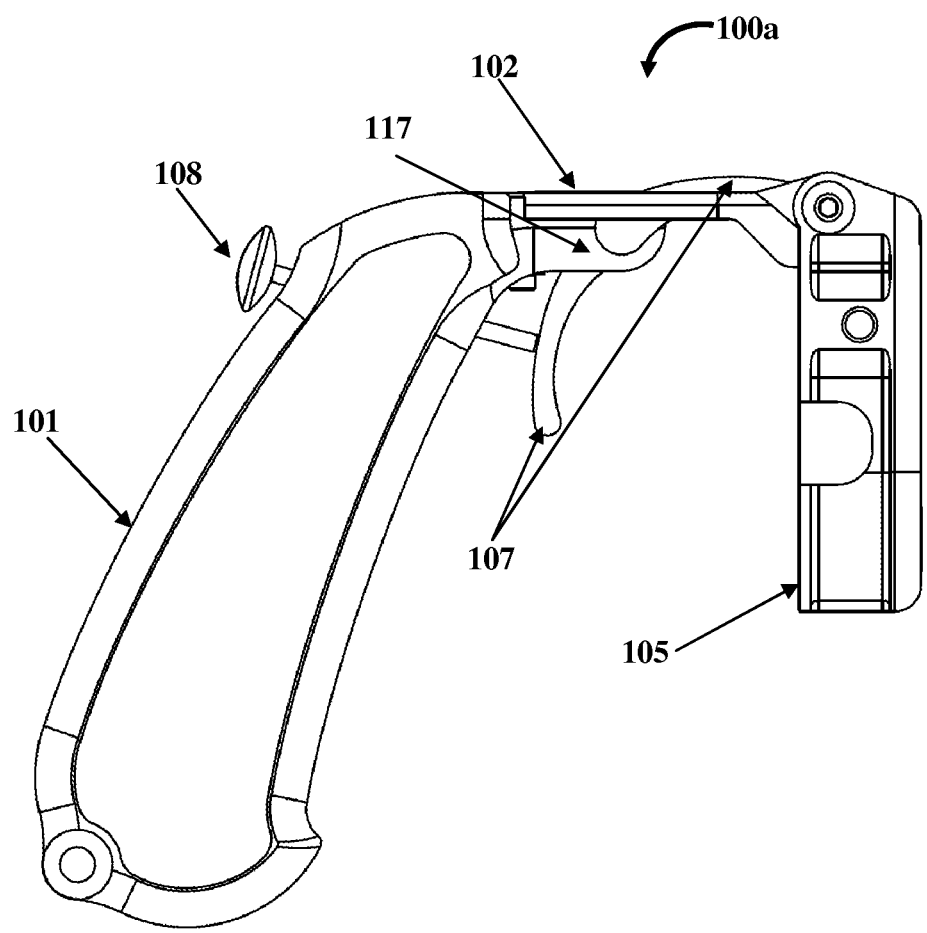
FIG. 4E exemplarily illustrates a left side elevation view of the flippable device support and trigger apparatus, showing the cage member positioned in an upright position in front of the handle.
Figure 4F:
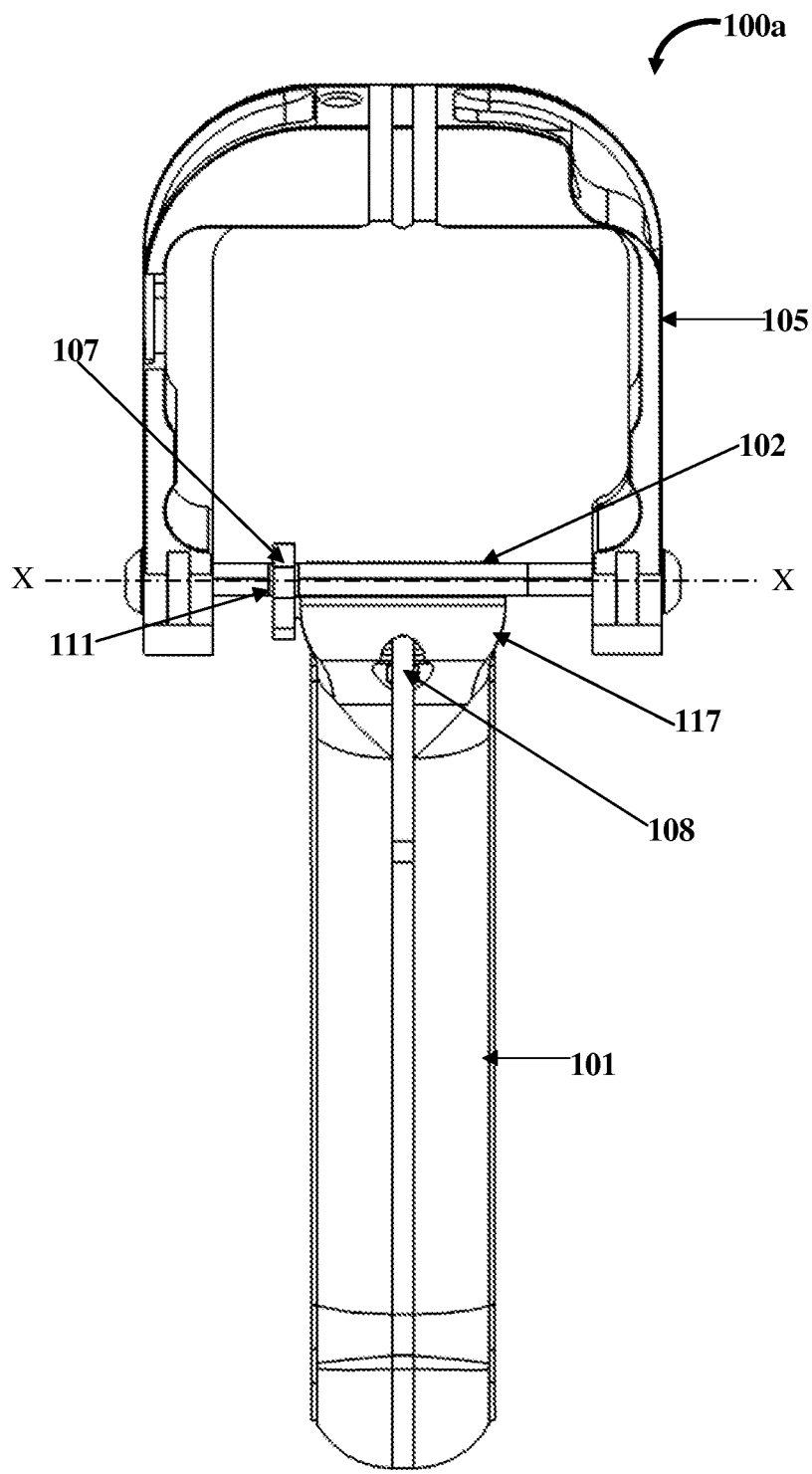
FIG. 4F exemplarily illustrates a front elevation view of the flippable device support and trigger apparatus, showing the cage member positioned in an inverted position above the handle.
Figure 4G:
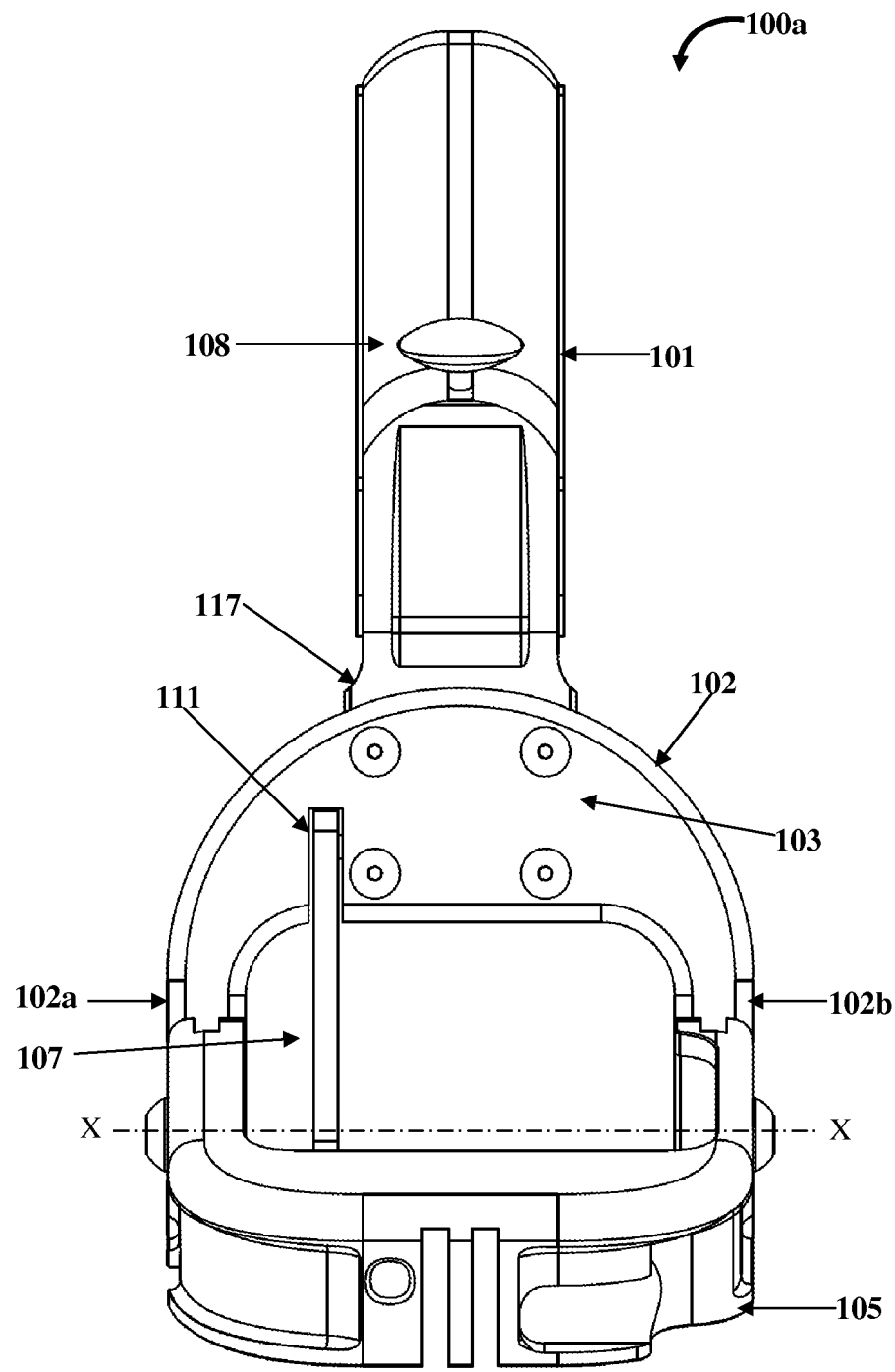
FIG. 4G exemplarily illustrates a top plan view of the flippable device support and trigger apparatus when the cage member is positioned in an inverted position.
Figure 4H:
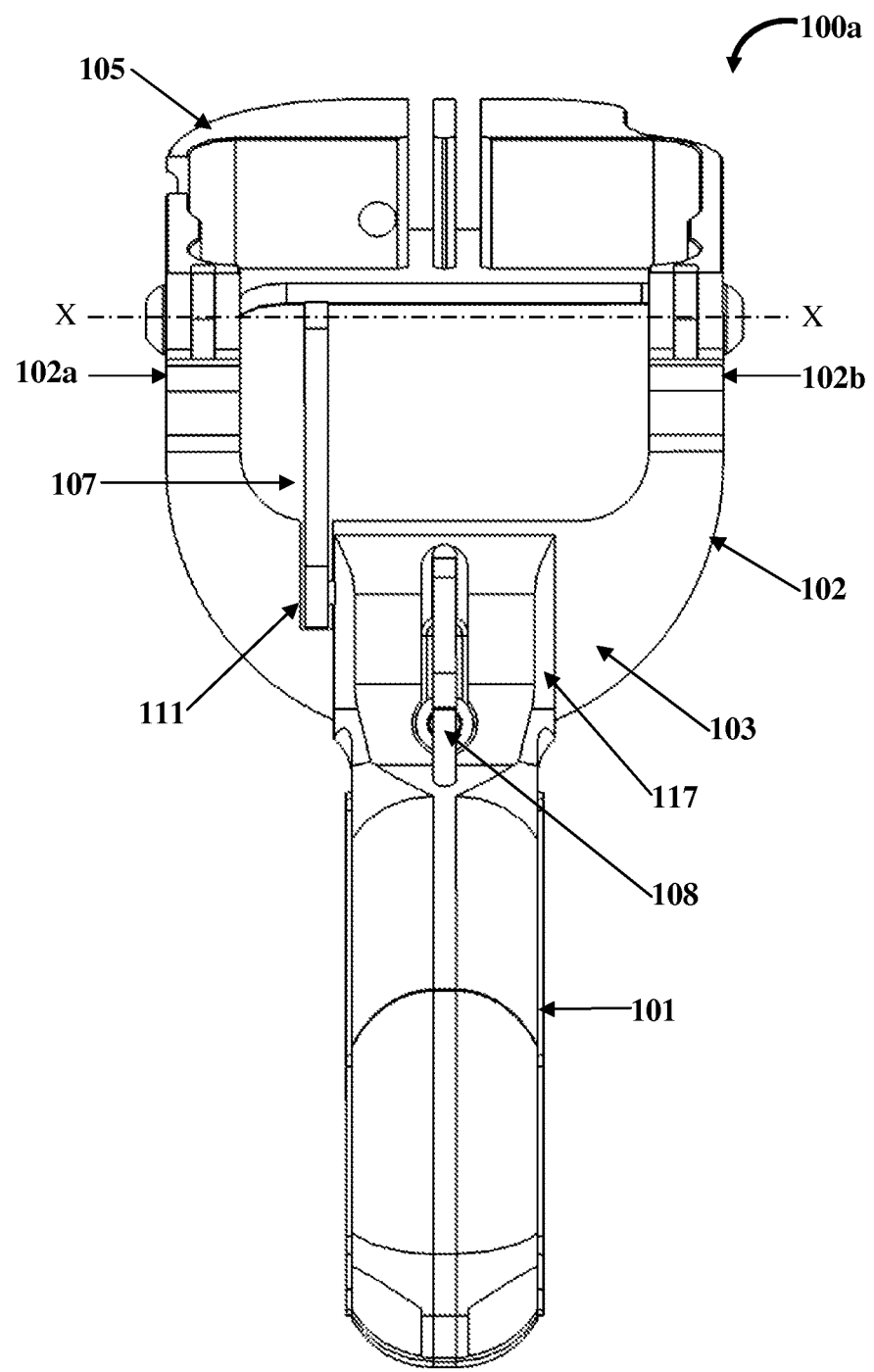
FIG. 4H exemplarily illustrates a bottom view of the flippable device support and trigger apparatus when the cage member is positioned in an inverted position.
Figure 4I:
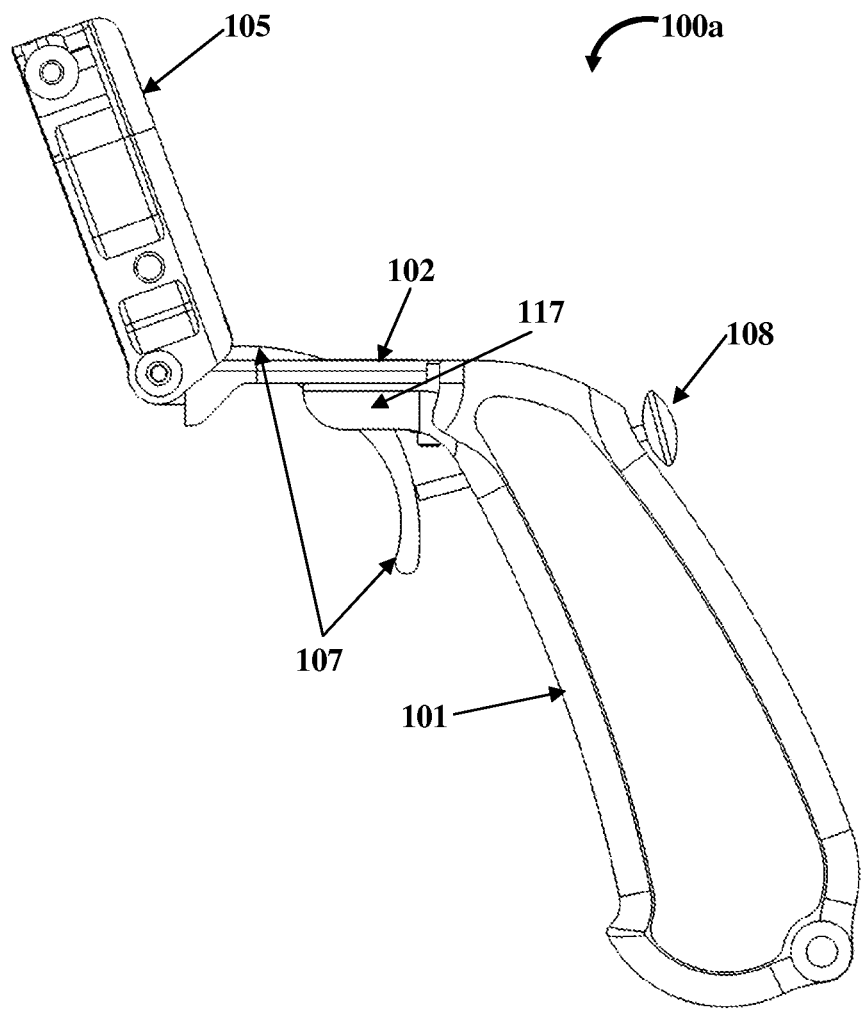
FIG. 4I exemplarily illustrates a right side elevation view of the flippable device support and trigger apparatus, showing the cage member positioned in an inverted position above the handle.

FIGS. 4A-4I exemplarily illustrate different elevation views of the flippable device support and trigger apparatus 100a. FIG. 4A exemplarily illustrates a front elevation view of the flippable device support and trigger apparatus 100a, showing the cage member 105 positioned in an upright position in front of the handle 101. FIG. 4B exemplarily illustrates a top plan view of the flippable device support and trigger apparatus 100a when the cage member 105 is positioned in an upright position. FIG. 4C exemplarily illustrates a bottom view of the flippable device support and trigger apparatus 100a when the cage member 105 is positioned in the upright position. FIG. 4D exemplarily illustrates a right side elevation view of the flippable device support and trigger apparatus 100a, showing the cage member 105 positioned in the upright position in front of the handle 101. FIG. 4E exemplarily illustrates a left side elevation view of the flippable device support and trigger apparatus 100a, showing the cage member 105 positioned in the upright position in front of the handle 101. FIG. 4F exemplarily illustrates a front elevation view of the flippable device support and trigger apparatus 100a, showing the cage member 105 positioned in an inverted position above the handle 101. FIG. 4G exemplarily illustrates a top plan view of the flippable device support and trigger apparatus 100a when the cage member 105 is positioned in the inverted position. FIG. 4H exemplarily illustrates a bottom view of the flippable device support and trigger apparatus 100a when the cage member 105 is positioned in the inverted position. FIG. 4I exemplarily illustrates a right side elevation view of the flippable device support and trigger apparatus 100a, showing the cage member 105 positioned in the inverted position above the handle 101.

The flippable device support and trigger apparatus 100a is assembled by interconnecting different components, for example, the handle 101, the frame member 102, the cage member 105, the triggering assembly 107, and the push rod assembly 108. The frame member 102 is fastened to the intermediate member 117 that extends from the handle 101 by inserting the fastening members 119 exemplarily illustrated in FIG. 3, for example, four flat Allen screws, into the through holes 103c of the frame member 102 exemplarily illustrated in FIG. 3, and then into the through holes 118 of the intermediate member 117 while maintaining the triggering assembly 107 in position at the notch 111. The triggering assembly 107 is seated and pivotally connected on the notch 111 positioned on the support section 103 of the frame member 102.

The openings 120a and 120b of the cage member 105 are aligned with the openings 122a and 122b of the hinge elements 104a and 104b that are connected to the arms 102a and 102b of the frame member 102 respectively as exemplarily illustrated in FIG. 3. The tension fasteners 121a and 121b exemplarily illustrated in FIG. 3, are inserted through the openings 120a and 120b of the cage member 105 and through the openings 122a and 122b of the hinge elements 104a and 104b respectively, to pivotally fasten the cage member 105 to the frame member 102. The push rod assembly 108 exemplarily illustrated in FIG. 3, is connected to the handle 101 by inserting the rod member 112 with the push button 113 through the opening 126 in the handle 101 to communicate with the trigger section 109 of the triggering assembly 107. The device 201 is further fastened in the receptacle 106 of the cage member 105 using the device fastener 301. In an embodiment, each component of the flippable device support and trigger apparatus 100a is manufactured, for example, by computer numerical control (CNC) machining from billet or extrusion, cast from metals, or can be injection molded from plastics. The dimensions of the flippable device support and trigger apparatus 100a in the upright position is, for example, about 6.5 inches×5.5 inches×3 inches. The dimensions of the flippable device support and trigger apparatus 100a in the flipped or inverted position is, for example, about 8 inches×7 inches×3 inches.

Figure 5A:
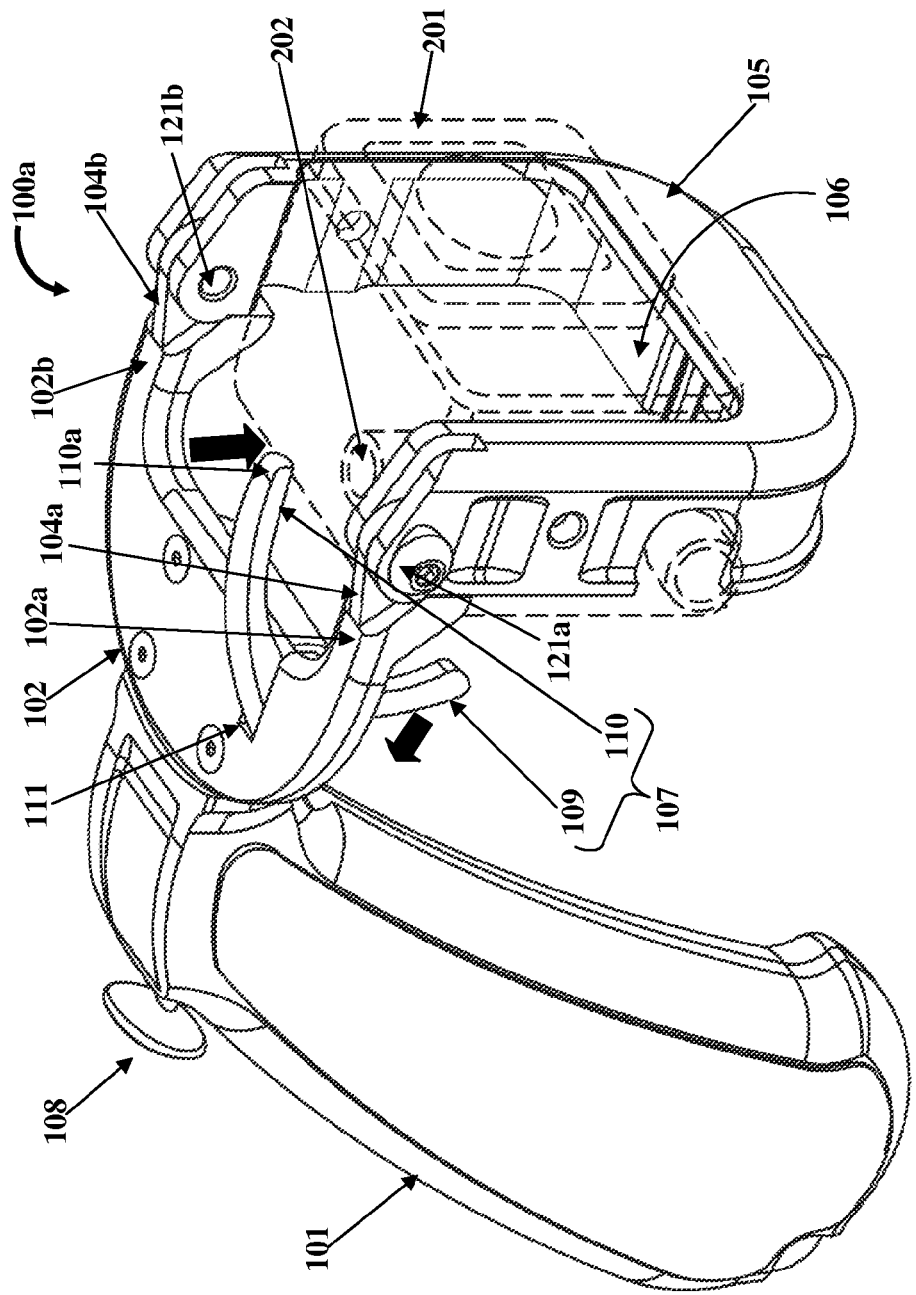
FIGS. 5A-5B exemplarily illustrate left side perspective views of the flippable device support and trigger apparatus, showing actuation of a triggering assembly of the flippable device support and trigger apparatus for actuating an activation button of a device positioned in a receptacle of the cage member in an upright position in front of the handle.
Figure 5B:
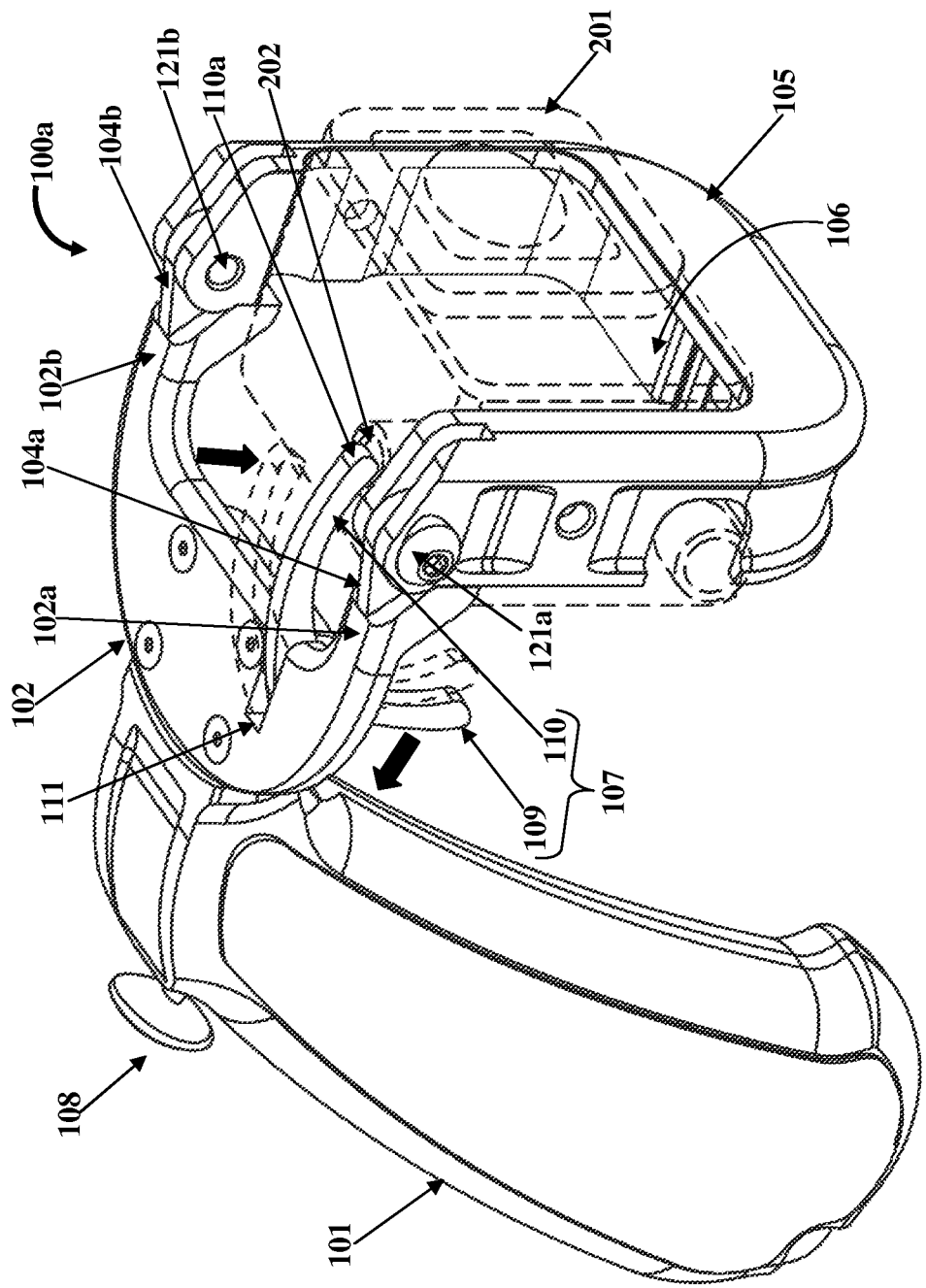

FIGS. 5A-5B exemplarily illustrate left side perspective views of the flippable device support and trigger apparatus 100a, showing actuation of the triggering assembly 107 of the flippable device support and trigger apparatus 100a for actuating an activation button 202 of a device 201 positioned in the receptacle 106 of the cage member 105 in an upright position in front of the handle 101. A user tightens the two tension fasteners 121a and 121b to position the cage member 105 in the upright position under tension at the arms 102a and 102b of the frame member 102. The device 201, for example, a GoPro® camera, is powered on and accommodated in the receptacle 106 of the cage member 105 and fastened therein using the device fastener 301 exemplarily illustrated in FIG. 3, such that a tip 110a of the actuation section 110 of the triggering assembly 107 is proximal to the activation button 202 of the device 201. As exemplarily illustrated in FIG. 5A, the trigger section 109 of the triggering assembly 107 is pulled in a backward direction as exemplarily illustrated by the direction of the block arrow shown proximal to the trigger section 109 in FIG. 5A, for example, using the index finger of one hand of the user, to provide leverage for the actuation section 110 pivotally connected to the trigger section 109 to move in a downward direction as exemplarily illustrated by the direction of the block arrow shown proximal to the actuation section 110 in FIG. 5A. The movement of the actuation section 110 in the downward direction allows the tip 110a of the actuation section 110 to make contact with the activation button 202 of the device 201 as exemplarily illustrated in FIG. 5B. The change in position of the triggering assembly 107 prior to and after the pull of the trigger section 109 of the triggering assembly 107 by the user's index finger is exemplarily illustrated in FIG. 5B. The activation button 202 of the device 201 is therefore pressed in a downward direction by the tip 110a of the actuation section 110 to trigger the device 201 to capture a still image and/or a moving image or video of an object or an environment in front of the user.

Figure 6A:
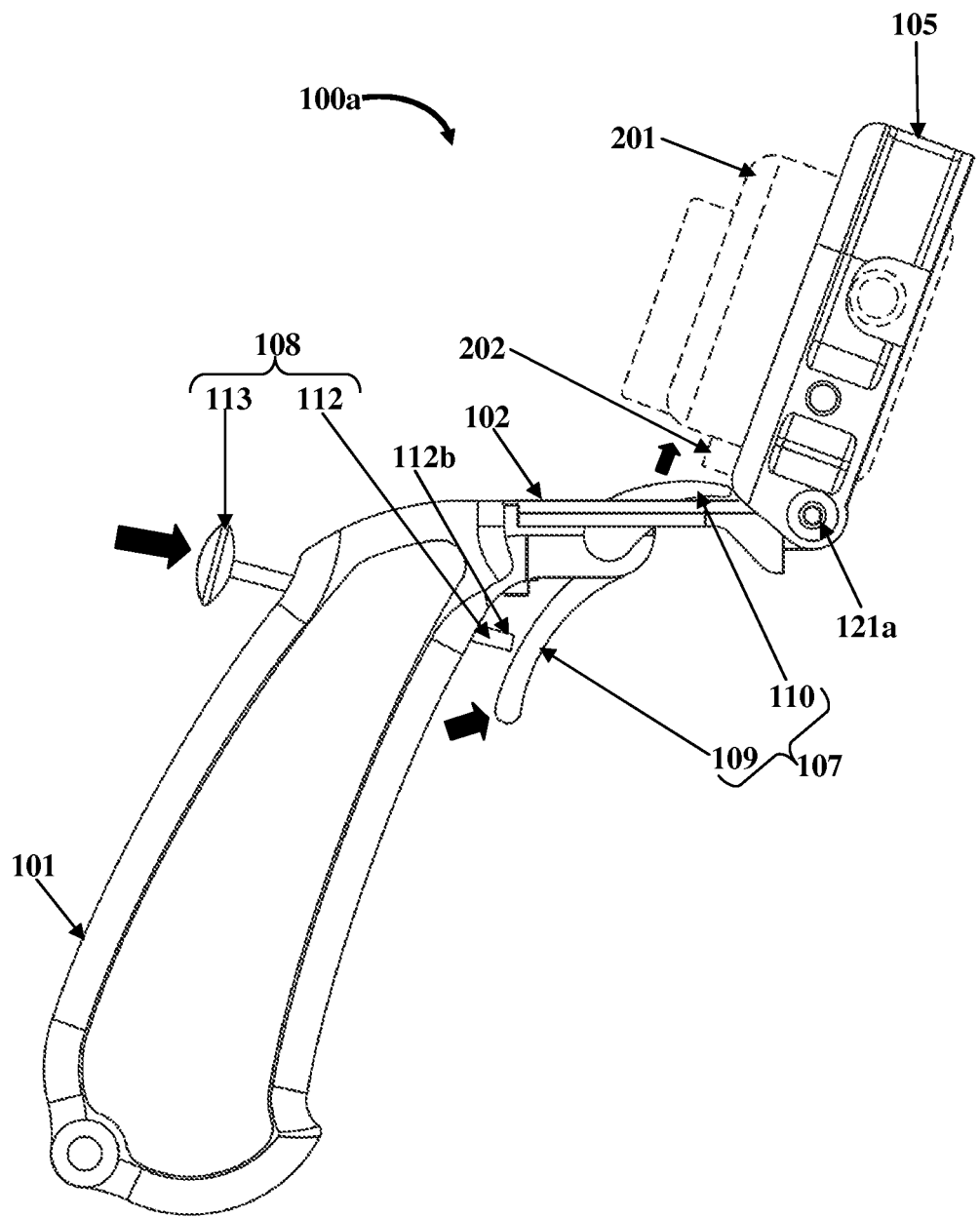
FIGS. 6A-6B exemplarily illustrate left side elevation views of the flippable device support and trigger apparatus, showing actuation of the triggering assembly for actuating an activation button of a device positioned in the receptacle of the cage member in an inverted position above the handle.
Figure 6B:
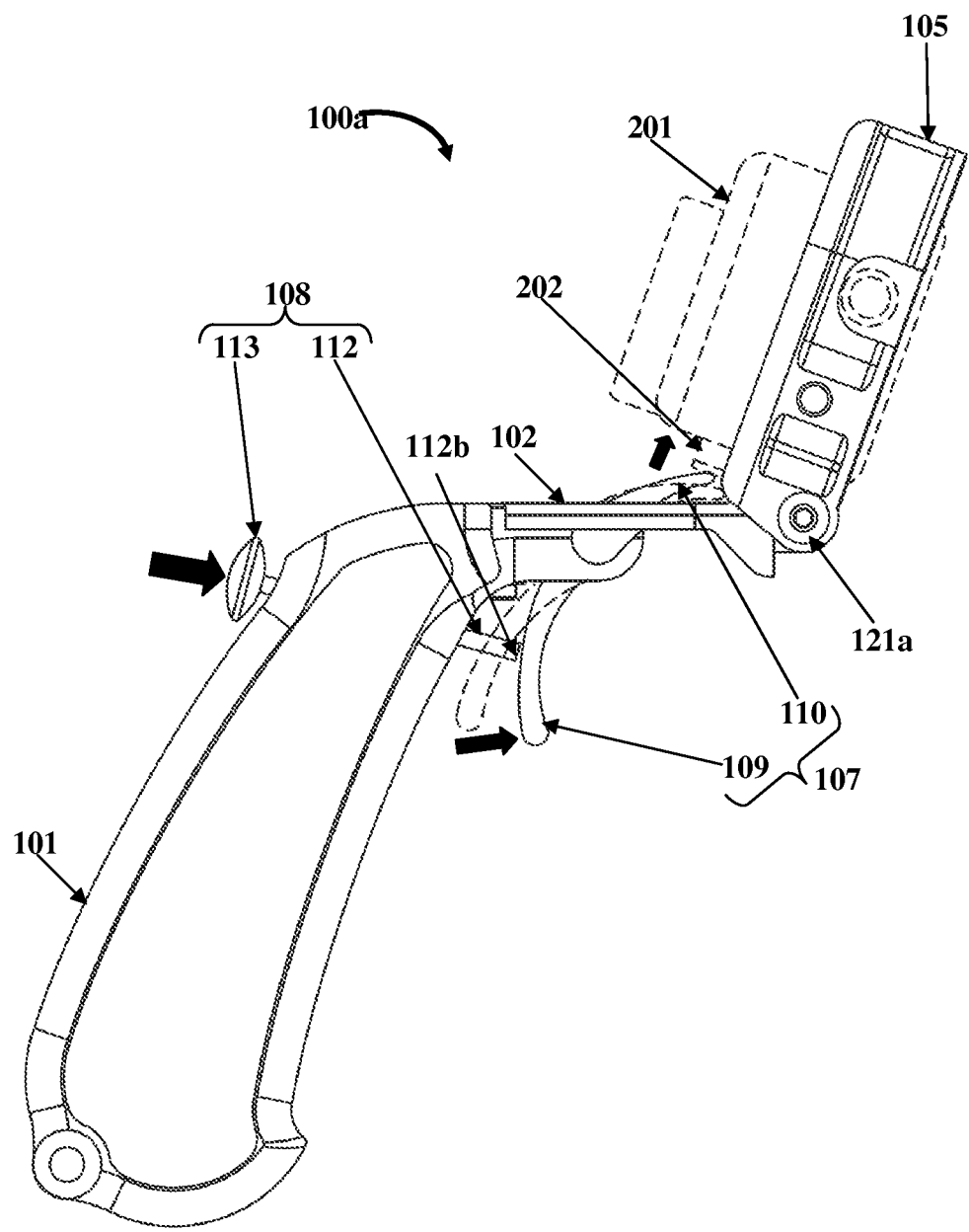

FIGS. 6A-6B exemplarily illustrate left side elevation views of the flippable device support and trigger apparatus 100a, showing actuation of the triggering assembly 107 for actuating an activation button 202 of a device 201 positioned in the receptacle 106 of the cage member 105 in an inverted position above the handle 101. In an example, when a user wants to capture self portrait still images and/or moving images or videos of one's self in an environment using the device 201, for example, a GoPro® camera, the user loosens the two tension fasteners 121a and 121b to release the tension from the cage member 105 to allow the cage member 105 to be pivotally rotated and repositioned with respect to the frame member 102 in a flipped or inverted position. As exemplarily illustrated by the block arrow shown proximal to the push button 113 of the push rod assembly 108 in FIG. 6A, the user pushes the push button 113 of the push rod assembly 108, for example, using the thumb of one hand, to allow the end 112b of the rod member 112 of the push rod assembly 108 to move in a forward direction as exemplarily illustrated by the block arrow shown proximal to the trigger section 109 of the triggering assembly 107 in FIG. 6A, to contact the trigger section 109 as exemplarily illustrated in FIG. 6B. As exemplarily illustrated by the block arrows in FIG. 6B, the trigger section 109 actuates the actuation section 110 of the triggering assembly 107 to press the activation button 202 of the device 201. The actuation section 110 pivotally connected to the trigger section 109 moves in a generally upward direction as exemplarily illustrated by the direction of the block arrow shown proximal to the actuation section 110 in FIG. 6A. The change in position of the triggering assembly 107 prior to and after the push of the push button 113 of the push rod assembly 108 by the user's thumb is exemplarily illustrated in FIG. 6B. Since the user is standing behind the flippable device support and trigger apparatus 100a, the device 201, for example, the camera mounted in the flipped or inverted cage member 105 faces the user to allow the user to capture a self portrait still image and/or moving image or video. The triggering assembly 107 of the flippable device support and trigger apparatus 100a provides a single pivot point trigger or shutter activation mechanism for the lens of the camera.

In an embodiment, the activation button 202 of the device 201 within the cage member 105 is actuated by a user using the trigger section 109 in both the upright position and the inverted position of the cage member 105. More specifically, in the upright position of the cage member 105, both the cage member 105 and the device 201 within the cage member 105 are positioned in front of the handle 101. Upon pulling the trigger section 109 of the triggering assembly 107 with appropriate force, the actuation section 110 contacts the activation button 202 of the device 201 due to pivotal movement of the triggering assembly 107. Accordingly, pulling the trigger section 109 causes the actuation section 110 to move in a downward direction to contact the activation button 202 of the device 201. Further, in the inverted position of the cage member 105, both the cage member 105 and the device 201 within the cage member 105 are positioned above the handle 101. Upon pushing the trigger section 109 of the triggering assembly 107 with appropriate force, the actuation section 110 contacts the activation button 202 of the device 201 due to pivotal movement of the triggering assembly 107. Accordingly, pushing the trigger section 109 causes the actuation section 110 to move in an upward direction to contact the activation button 202 of the device 201. In an example scenario, if a user wants to capture images or videos using the device 201 (e.g., GoPro® camera), the user may position the cage member 105 in the upright position (by adjusting the tension fasteners 121a and 121b) in front of the handle 101 with respect to the frame member 202. Thereafter, the user may pull (e.g., using an index finger of one hand) the trigger section 109 in a backward direction towards the handle 101 to actuate the actuation section 110 to move in an upward direction thereby causing the actuation section 110 to press the activation button 202 of the device. Similarly, if a user wants to capture self portrait images and/or moving images or videos of one's self using the device 201 (e.g., GoPro® camera), the user may position the cage member 105 in the inverted position (by adjusting the tension fasteners 121a and 121b) above the handle 101 with respect to the frame member 202. Thereafter, the user may push the trigger section 109 in a direction away from the handle 101, for example by, using an index finger of one hand to actuate the actuation section 110 to move in a downward direction thereby causing the actuation section 110 to press the activation button 202 of the device.

As exemplarily illustrated in FIGS. 5A-5B and FIGS. 6A-6B, the structure of the flippable device support and trigger apparatus 100a enables placement of the device 201 in front of the hand that holds the handle 101; provides the triggering assembly 107 that acts as a single pivot point trigger or button activation mechanism that can be activated from either one or two positions by one hand; and a hinged or pivotal connection of the cage member 105 to the frame member 102 that allows the device 201, for example, a camera to pivot and be activated in one or two positions, for example, the upright position and/or the inverted position by one hand. In an embodiment, the flippable device support and trigger apparatus 100a allows positioning of the cage member 105 at any angle with respect to the frame member 102 in one of multiple positions to enable the user to capture still images and/or moving images of one or more objects or an environment from any angle.

Figure 7A:
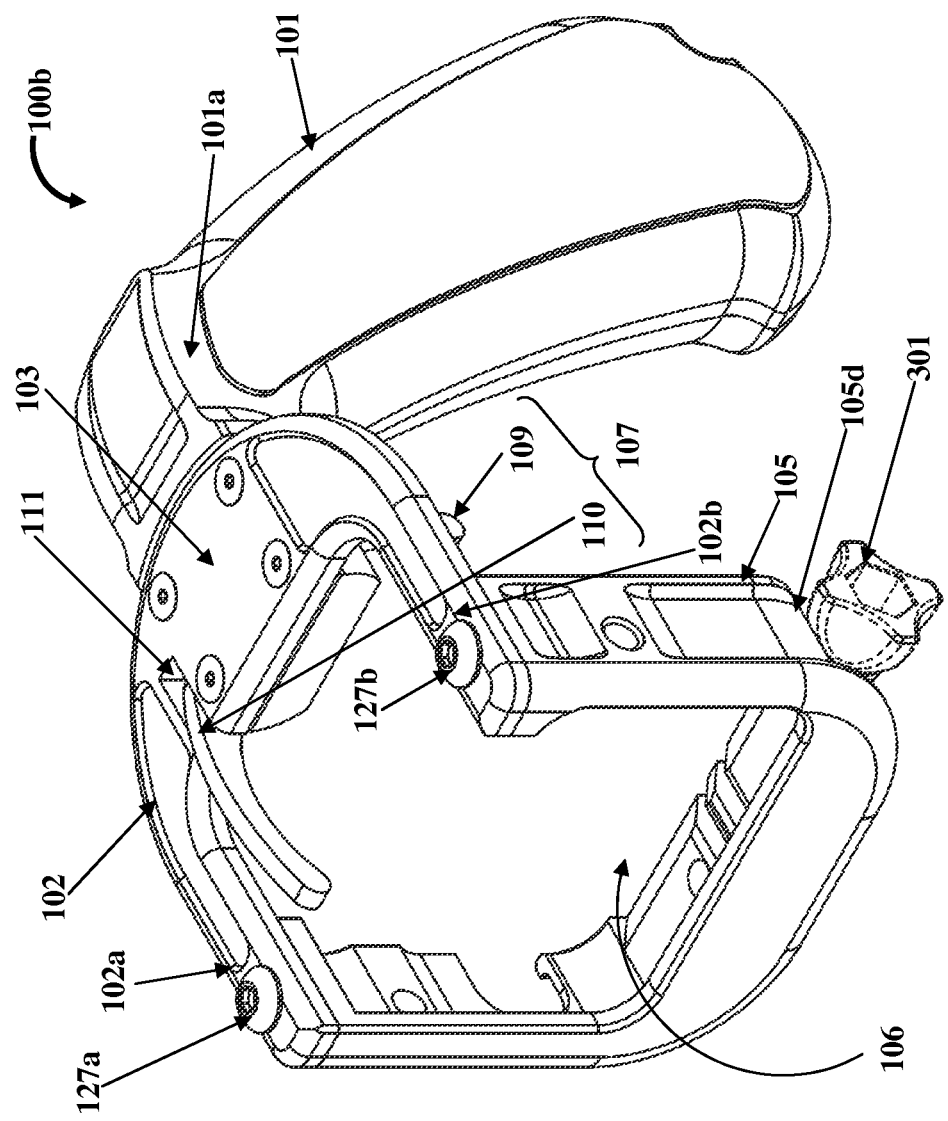
FIGS. 7A-7B exemplarily illustrate perspective views of an embodiment showing a non-flippable device support and trigger apparatus.
Figure 7B:
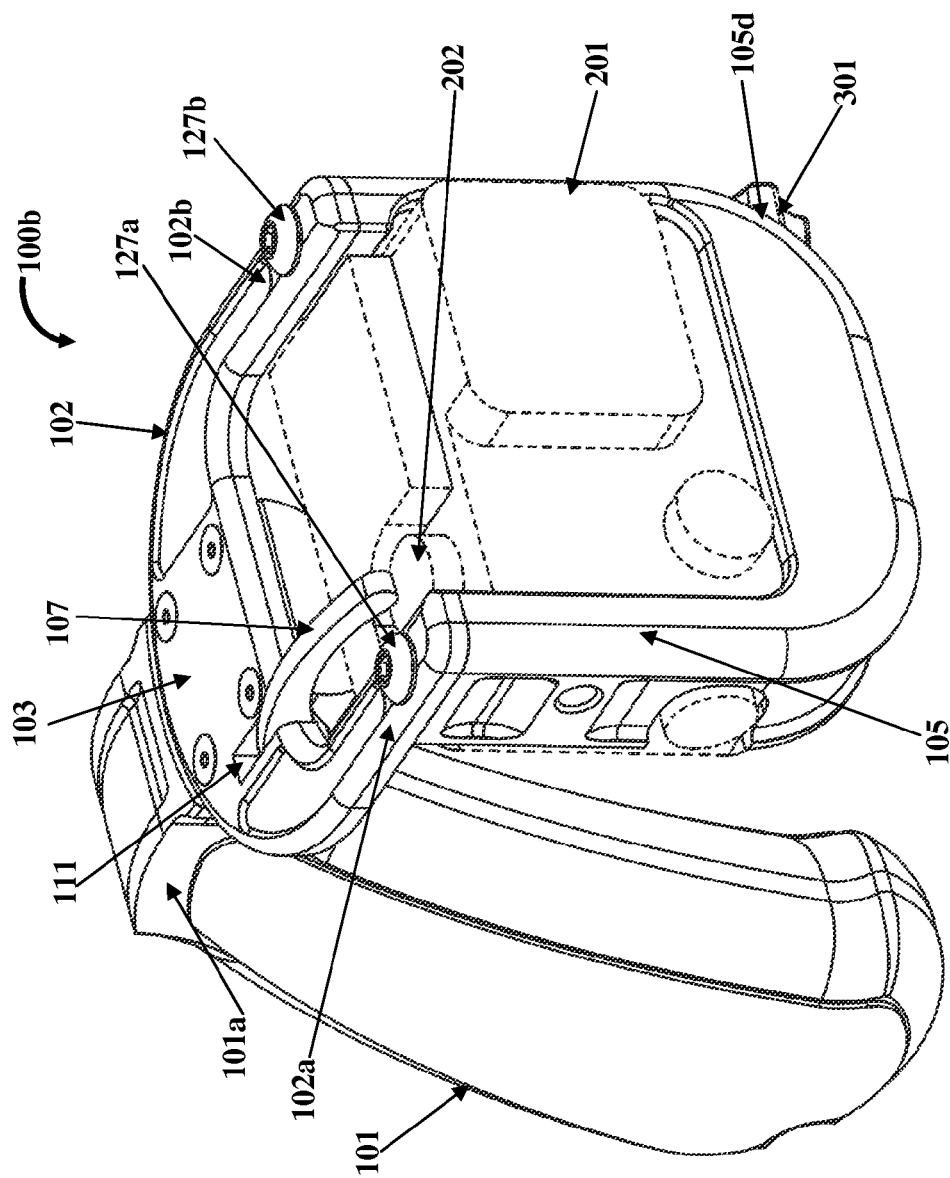

FIGS. 7A-7B exemplarily illustrate perspective views of an embodiment showing a non-flippable device support and trigger apparatus 100b. In this embodiment, the non-flippable device support and trigger apparatus 100b comprises the handle 101, frame member 102, the cage member 105, and the triggering assembly 107. The cage member 105 of the non-flippable device support and trigger apparatus 100b is rigidly connected to the arms 102a and 102b of the frame member 102 in an upright position in front of the handle 101, using tension fasteners 127a and 127b. The tension fasteners 127a and 127b are tightened to hold the cage member 105 in the upright position under a tension at the arms 102a and 102b of the frame member 102. The cage member 105 accommodates a device 201 in the upright position as exemplarily illustrated in FIG. 7B, to allow a user to capture still images and/or moving images or videos of objects or an environment in front of the user.

As exemplarily illustrated in FIG. 7B, the device 201, for example, the GoPro® camera is mounted into the receptacle 106 of the cage member 105 exemplarily illustrated in FIG. 7A, and secured in position by inserting and tightening the device fastener 301 or the knob into a bottom threaded portion 105d of the cage member 105. The handle 101 is held in one hand of the user and the triggering assembly 107 is pulled using an index finger of the same hand. The operation of the triggering assembly 107 comprising the trigger section 109 and the actuation section 110 to actuate the activation button 202 of the device 201 in the upright position is disclosed in the detailed description of FIGS. 5A-5B. The triggering assembly 107 pivotally moves within the notch 111 of the frame member 102 to contact and depress the activation button 202 of the device 201 to click still images and/or moving images or videos of objects or an environment in front of the user.

Figure 8:
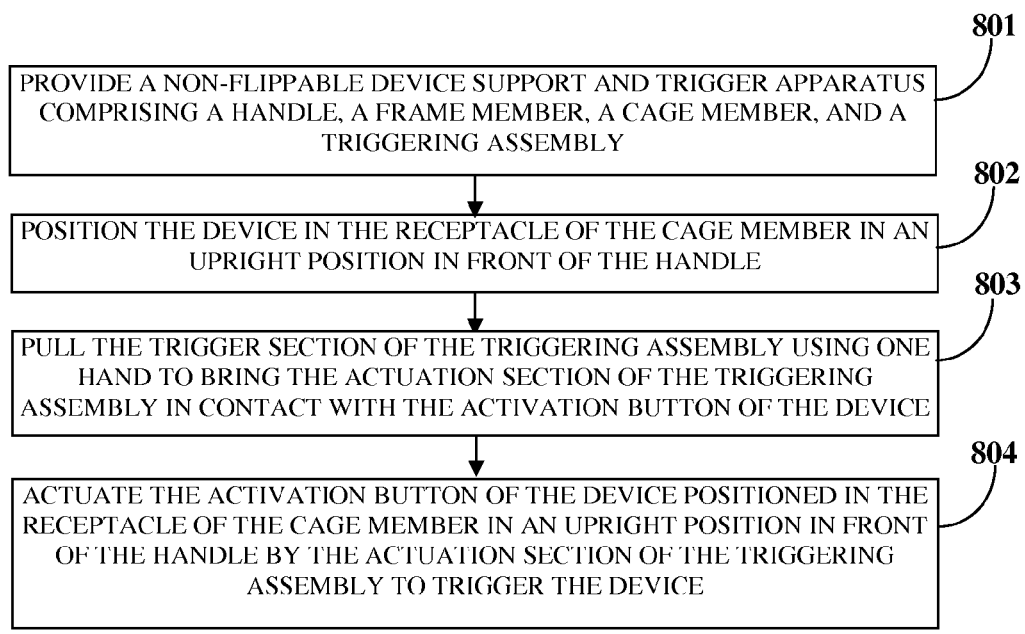
FIG. 8 illustrates a method for triggering a device in an upright position using one hand.

FIG. 8 illustrates a method for triggering a device 201 exemplarily illustrated in FIG. 7B, in an upright position using one hand. A non-flippable device support and trigger apparatus 100b comprising the handle 101, the frame member 102, the cage member 105, and the triggering assembly 107 as exemplarily illustrated in FIGS. 7A-7B, is provided 801. The device 201 is positioned 802 in the receptacle 106 of the cage member 105 in an upright position in front of the handle 101. A user using one hand pulls 803 the trigger section 109 of the triggering assembly 107 to bring the actuation section 110 of the triggering assembly 107 in contact with the activation button 202 of the device 201 positioned in the receptacle 106 of the cage member 105 in the upright position in front of the handle 101. The actuation section 110 actuates 804 the activation button 202 of the device 201 to trigger the device 201 to capture still images and/or moving images or videos of objects or an environment in front of the user.

Figure 9:
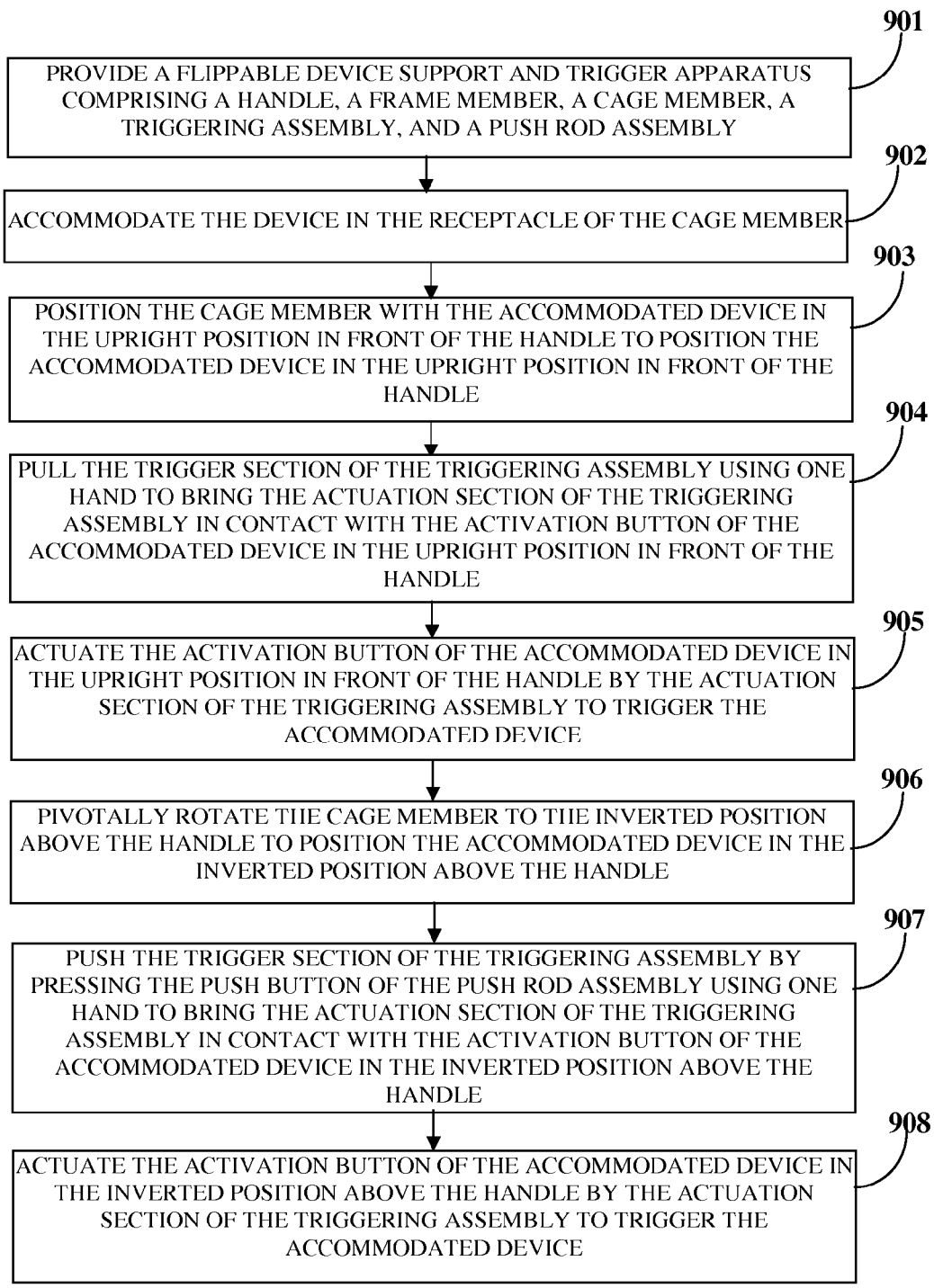
FIG. 9 illustrates a method for triggering a device in an upright position and an inverted position using one hand.

FIG. 9 illustrates a method for triggering a device 201 exemplarily illustrated in FIGS. 2A-2B, in an upright position and an inverted position using one hand. A flippable device support and trigger apparatus 100a comprising the handle 101, the frame member 102, the cage member 105, the triggering assembly 107, and the push rod assembly 108 as exemplarily illustrated in FIGS. 1A-6B, is provided 901. The device 201 is accommodated 902 in the receptacle 106 of the cage member 105. The cage member 105 with the accommodated device 201 is positioned 903 in an upright position in front of the handle 101 to position the accommodated device 201 in the upright position in front of the handle 101. A user using one hand pulls 904 the trigger section 109 of the triggering assembly 107 to bring the actuation section 110 of the triggering assembly 107 in contact with the activation button 202 of the accommodated device 201 in the upright position in front of the handle 101. The actuation section 110 actuates 905 the activation button 202 of the accommodated device 201 in the upright position in front of the handle 101 to trigger the accommodated device 201 in the upright position in front of the handle 101 to capture still images and/or moving images or videos of objects or an environment in front of the user. The cage member 105 is pivotally rotated 906 to the inverted position above the handle 101 to position the accommodated device 201 in the inverted position above the handle 101. The user presses the push button 113 of the push rod assembly 108 using one hand to push 907 the trigger section 109 of the triggering assembly 107 to bring the actuation section 110 of the triggering assembly 107 in contact with the activation button 202 of the accommodated device 201 in the inverted position above the handle 101. The actuation section 110 actuates 908 the activation button 202 of the accommodated device 201 in the inverted position above the handle 101 to trigger the accommodated device 201 in the inverted position above the handle 101 to capture still images and/or moving images or videos of one's self in an environment.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A device support and trigger apparatus comprising:
  a handle;
  a frame member fixedly attached to an upper end of said handle, said frame member comprising a support section and arms, said arms extending from opposing ends of said support section;
  a cage member, said cage member comprising:
    opposing walls and a base section defining a receptacle to accommodate a device within said receptacle; and
    one or more fasteners for fastening said cage member to said frame member; and
  a triggering assembly comprising a trigger section disposed along a vertical plane and an actuation section disposed along a horizontal plane, said trigger section connected to said actuation section at a mid-section of said triggering assembly, said mid-section of said triggering assembly seated on said handle and at a notch positioned on said support section of said frame member, said triggering assembly configured to pivotally move about said support section of said frame member, said actuation section extending above said receptacle of said cage member and protruding forwardly from said support section in said horizontal plane in front of said handle, said actuation section configured to pivot and contact an activation button of said device, located below said actuation section, upon actuation of said trigger section of said triggering assembly.

2. The device support and trigger apparatus of claim 1, wherein said handle comprises a handle frame, a first segment, and a second segment, wherein said first segment and said second segment are adjoined to each other within a space defined in said handle frame.

3. The device support and trigger apparatus of claim 1, wherein said triggering assembly is configured to operably communicate with said device accommodated in said receptacle of said cage member and contact an activation button of said device accommodated in said receptacle of said cage member positioned in an upright position in front of said handle, and said trigger section configured to be pulled using one hand to bring said actuation section in contact with said activation button of said device to actuate said activation button of said device.

4. The device support and trigger apparatus of claim 1, further comprising an intermediate member fixedly attached to and extending from said handle, wherein said intermediate member comprises one or more through holes to fixedly attach said intermediate member to said frame member using one or more fastening members.

5. The device support and trigger apparatus of claim 1, wherein said frame member is of a generally U shape.

6. The device support and trigger apparatus of claim 1, wherein said cage member is of a generally U shape.

7. The device support and trigger apparatus of claim 1, wherein said one or more fasteners comprise at least two tension fasteners configured to connect said cage member to said arms of said frame member, wherein said at least two tension fasteners are tightened to hold said cage member in said upright position under a tension at said arms of said frame member.

8. The device support and trigger apparatus of claim 1, wherein said receptacle of said cage member is configured in one of a plurality of shapes and sizes to accommodate said device of one of different shapes and sizes.

9. The device support and trigger apparatus of claim 1, further comprising a push rod assembly comprising:
  a rod member inserted through an opening in said handle to contact said trigger section of said triggering assembly; and
  a push button operably connected to a distal end of said rod member, said push button configured to push said trigger section of said triggering assembly via said rod member.

10. A device support and trigger apparatus for an imaging device, comprising:
  a handle:
  a frame member fixedly attached to an upper end of said handle, said frame member comprising a support section and arms, said arms forwardly extending from opposing ends of said support section along a horizontal plane;
  a cage member connected to said arms of said support section, said cage member extending downwardly from said arms and terminating proximal to a base of said handle, said cage member comprising:
    opposing walls and a base section defining a receptacle to accommodate said imaging device within said receptacle, each of said opposing walls comprising an upper end and a lower end, said base section connecting said lower ends of said opposing walls, one of said arms connected to said upper end of one of said opposing walls and another of said arms connected to said upper end of another one of said opposing walls; and
  a triggering assembly comprising a trigger section disposed along a vertical plane and an actuation section disposed along said horizontal plane, said trigger section connected to said actuation section at a mid-section of said triggering assembly, said mid-section of said triggering assembly seated on said handle and at a notch positioned on said support section of said frame member, said triggering assembly configured to pivotally move about said support section of said frame member, said actuation section extending above said receptacle of said cage member and protruding forwardly from said support section in said horizontal plane in front of said handle, said actuation section configured to pivot and contact an activation button of said imaging device, located below said actuation section, upon actuation of said trigger section of the triggering assembly.

11. A device support and trigger apparatus comprising:
a handle;
a frame member fixedly attached to an upper end of said handle, said frame member comprising a support section and arms, said arms extending from opposing ends of said support section;
a cage member pivotally connected to said arms extending from said opposing ends of said support section, said cage member comprising:
  a receptacle configured to accommodate a device, said cage member with said accommodated device is pivotally rotatable with respect to said frame member in at least one of an upright position in front of the said handle and an inverted position above said handle; and
a triggering assembly comprising a trigger section and an actuation section, said trigger section connected to said actuation section, said triggering assembly configured to pivotally move about said support section of said frame member, said actuation section extending above said receptacle of said cage member,
wherein upon pulling said trigger section, said actuation section is configured to contact an activation button of said device to actuate said activation button when said cage member with said accommodated device is positioned in said upright position in front of the said handle, and
wherein upon pushing said trigger section, said actuation section is configured to contact an activation button of said device to actuate said activation button when said cage member with said accommodated device is positioned in said inverted position above said handle.

* * * * *